United States Patent [19]

Kajiya et al.

[11] Patent Number: 5,448,626
[45] Date of Patent: Sep. 5, 1995

[54] FACSIMILE MAIL SYSTEM HAVING MEANS FOR STORING FACSIMILE SIGNALS AND TELEPHONE SIGNALS

[75] Inventors: Takanori Kajiya; Hiroshi Ohta, both of Tokyo, Japan

[73] Assignee: Nippon Steel Corporation, Tokyo, Japan

[21] Appl. No.: 158,369

[22] Filed: Nov. 29, 1993

Related U.S. Application Data

[63] Continuation of Ser. No. 844,228, Mar. 2, 1992, abandoned.

[30] Foreign Application Priority Data

| Mar. 5, 1991 | [JP] | Japan | 3-065421 |
| Mar. 5, 1991 | [JP] | Japan | 3-065422 |
| Mar. 5, 1991 | [JP] | Japan | 3-065423 |

[51] Int. Cl.[6] ............................................. H04M 1/64
[52] U.S. Cl. ...................................... 379/67; 379/88; 379/93; 379/100; 379/211
[58] Field of Search .............. 379/67, 88, 89, 100, 379/211, 212, 93, 94

[56] References Cited

U.S. PATENT DOCUMENTS

| 4,602,129 | 7/1986 | Matthews et al. | 379/89 |
| 4,837,798 | 6/1989 | Cohen et al. | 379/88 |
| 4,932,042 | 6/1990 | Baral et al. | 379/100 |
| 4,994,926 | 2/1991 | Gordon et al. | 379/100 |

FOREIGN PATENT DOCUMENTS

| 0458540 | 11/1991 | European Pat. Off. |
| 0165452 | 9/1983 | Japan . |
| 0186253 | 10/1983 | Japan . |
| 0169262 | 9/1984 | Japan . |
| 0221258 | 9/1987 | Japan . |
| 0081559 | 3/1990 | Japan | 379/100 |

*Primary Examiner*—James L. Dwyer
*Assistant Examiner*—Fan Tsang
*Attorney, Agent, or Firm*—Pollock, Vande Sande & Priddy

[57] ABSTRACT

Disclosed is a facsimile mail system which comprises: a switching means having an input side connected to an outside telephone circuit and an output side connected to a plurality of telephones and at least one facsimile device; a facsimile mail storage means connected to the output side of the switching means and having a plurality of storage regions use of which are specified respectively; a judgment and control means for judging whether a telephone signal received by the switching means is a voice signal or a facsimile signal to thereby give a transfer request to the switching means that the switching means connects the telephone signal to one of the telephones addressed by a destination of the telephone signal when the telephone signal is a voice signal while the switching means connects the telephone signal to the facsimile mail storage means when the telephone signal is a facsimile signal; and means for selecting one of the storage regions specified by the destination of the telephone signal and for accumulating the received facsimile signal connected to the facsimile mail storage means.

30 Claims, 17 Drawing Sheets

FIG. 2

| TELEPHONE/ FAX No. | NUMBER FOR CONTACT | | MAIL BOX No. | PERSONAL ID No. |
|---|---|---|---|---|
| | TELE-PHONE | FAX | | |
| 1111 | 1111 | 3111 | 1 | 8 |
| 1112 | 1112 | 3111 | 2 | - |
| 1113 | 1113 | 3111 | 3 | 7 |
| 1114 | 1114 | 3111 | 4 | - |
| 1115 | 1115 | 3111 | 5 | 6 |
| 1116 | 1116 | 3112 | 6 | 5 |
| 1117 | 1117 | 3112 | 7 | 4 |
| 1118 | 1118 | 3112 | 8 | 3 |
| 1119 | 1119 | 3112 | 9 | 2 |
| 1120 | 1120 | 3112 | 10 | 1 |

FIG. 8

| FAX No. | FAX No. FOR CONTACT | TELEPHONE No. FOR CONTACT | MAIL BOX No. | PERSONAL ID No. |
|---|---|---|---|---|
| 1111 | 2111 | 2111 | 1 | 11 |
| 1112 | 2111 | 2111 | 2 | 12 |
| 1113 | 2111 | 2112 | 3 | - |
| 1114 | 2111 | 2113 | 4 | 14 |
| 1115 | 2111 | 2114 | 5 | 15 |
| 1116 | 2112 | 2115 | 6 | - |
| 1117 | 2112 | 2115 | 7 | 17 |
| 1118 | 2112 | 2116 | 8 | 18 |
| 1119 | 2112 | 2117 | 9 | 19 |
| 1120 | 2112 | 2118 | 10 | 20 |

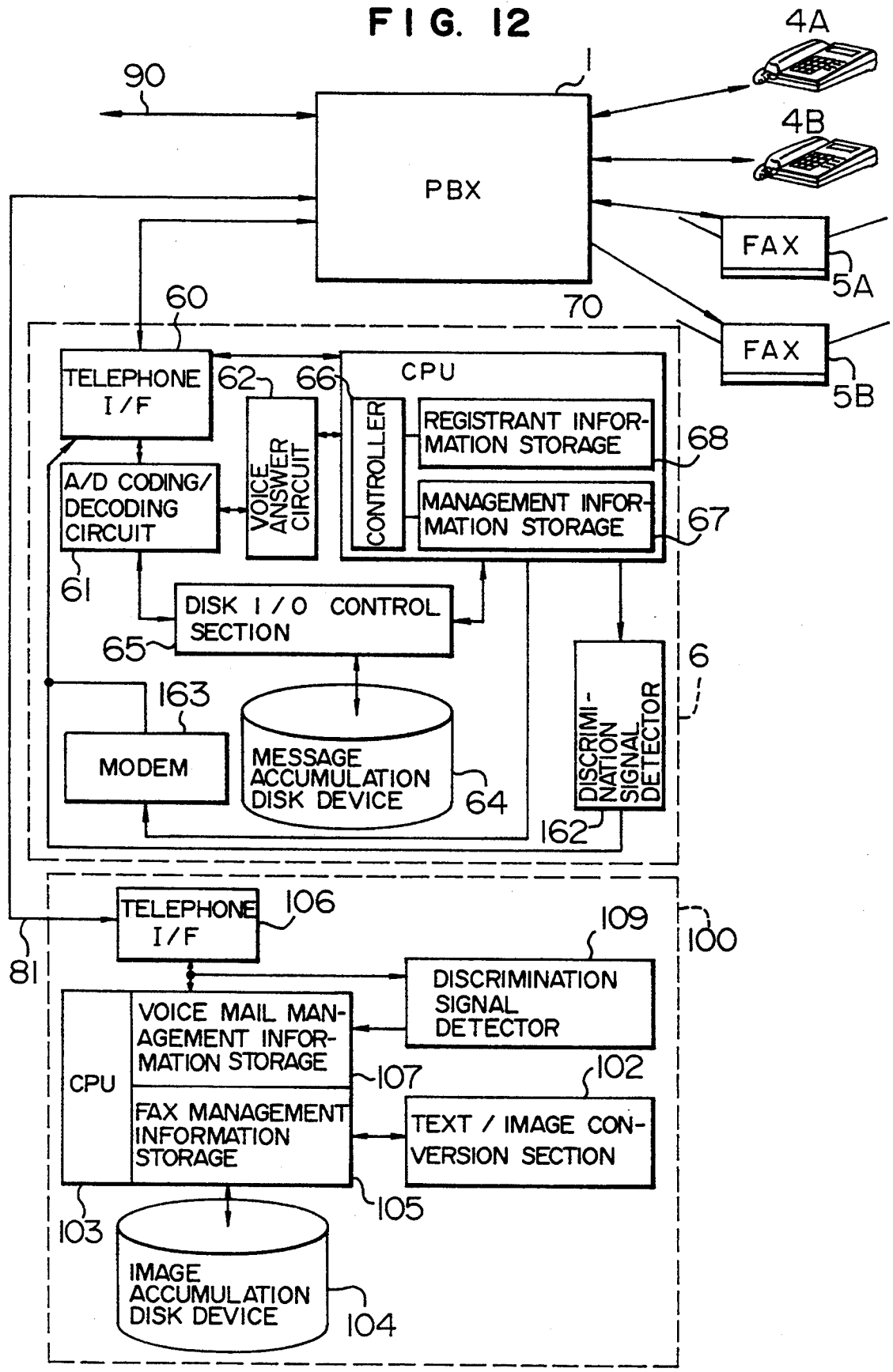

FIG. 13

| USER'S TELEPHONE No. | 1111 | 2222 | 4444 | 5555 | ...... |
|---|---|---|---|---|---|
| USER'S NAME | ICHIRO MARUNO | JIRO MARUNO | SUBURO MARUNO | SHIRO MARUNO | ...... |
| PASSWORD | 2542 | 3568 | 2589 | 8597 | ...... |
| MAIL BOX NUMBER | 1111 | 2222 | 4444 | 5555 | ...... |
| USER'S FAX NUMBER | 1234 | 2234 | 3334 | 1234 | ...... |
| USER'S SECTION | SECTION 1 | SECTION 2 | SECTION 3 | SECTION 1 | ...... |
| MANAGEMENT INFORMATION OUTPUT TIME | 8:00 | 8:30 | 8:00 | 18:00 | |
| ...... | | | | | |

FIG. 14

BOXNO: 3333
BOXNO: 2222
BOXNO: 1111
RECEPTION RECORD

| NO | TIME | NEED OR NOT OF CALL-BACK | EXTENSION/ OUTSIDE-LINE | OTHER SIDE | | |
|---|---|---|---|---|---|---|
| | | | | NAME | SECTION | TEL |
| 1 | 10:01 | YES | EXTENSION | ICHIRO MARUNO | SECTION 1 | 1111 |
| 2 | 12:20 | NO | EXTENSION | JIRO MARUNO | SECTION 2 | 2222 |
| 3 | 14:21 | YES | OUTSIDE-LINE | **** | *** | 0312344567 |
| 4 | 12:20 | YES | EXTENSION | JIRO MARUNO | SECTION 2 | 2222 |
| | | | | | | |

TRANSMISSION RECORD

| NO | TIME | OTHER SIDE | COMMUNICATION RESULT |
|---|---|---|---|
| 1 | 11:01 | 2147 | GOOD  NOT-YET READ |
| 2 | 18:26 | 3368 | GOOD  NOT-YET READ |
| 3 | 20:21 | 2489 | GOOD  READ |
| 4 | 21:20 | 0312345678 | GOOD  NOT-YET READ |
| | | | |
| | | | |

FACSIMILE MAIL SYSTEM HAVING MEANS FOR STORING FACSIMILE SIGNALS AND TELEPHONE SIGNALS

This application is a continuation, of Ser. No. 844,228, filed on Mar. 2, 1992, now abandoned.

BACKGROUND OF THE INVENTION

1. Field of the Invention

The present invention is generally relating to a facsimile main system and particularly relating to a facsimile mail system which provides excellent service by combination with a private branch exchange system (PBX).

2. Description of the Related Art

In a conventional facsimile mail system, in the case where the facsimile equipment on the reception side is busy or a facsimile accumulator of a specified number is designated, the reception telephone circuit is switched to the facsimile accumulator so that the facsimile signal is temporarily accumulated in the facsimile accumulator and transmitted to an individual facsimile device so as to be printed out by the facsimile device. Further, with respect to a confidential or private facsimile mail, the access to the mail is restricted by use of a password, as described in Japanese Patent Unexamined Publication No. JP-A-62-221258 (1987). As references about such a facsimile mail system, there are Japanese Patent Unexamined Publications Nos. JP-A-58-165452 (1983) and JP-A-58-186253 (1983).

In offices, recently, it is very usual that one facsimile device is provided for each group of several persons while one telephone is provided individually for each person. It is very rare, if any, that one facsimile device is provided for each person. Further, for a confidential or private facsimile mail, it is necessary to input a code representing "confidential" and a reception mail box-number in advance. Further, when a facsimile mail is to be transmitted to a conventional facsimile accumulation switching system, it is necessary in advance to input the call number of the facsimile accumulation switching system for the destination side and subsequently input the mail box number in the facsimile accumulation switching system, so that the input work is troublesome.

Further, in a known system as disclosed in Japanese Patent Unexamined Publication No. JP-A-59-169262 (1984), voice message Journal information is temporarily accumulated in a voice mail device when a telephone recipient is absent, and the recipient can make the accumulated voice message journal information be outputted after media-converted into a facsimile form by inputting a terminal device number into the voice mail device. The journal information transmitted through such a conventional voice mail device includes information on the existence of any message, the number and the reception dates and times of the messages received in a user's mail box, but no information on the degrees of importance of the respective messages. It is therefore impossible to hear the messages selectively in order of degree of importance. This applies also to the case of outputting the journal information through a facsimile device.

SUMMARY OF THE INVENTION

An object of the present invention is therefore to provide a facsimile mail system in which a facsimile message transmitted with a predetermined call signal can be automatically accumulated into a mail box designated by the predetermined call signal. The predetermined call signal is a telephone/facsimile number of a user to which the message is transmitted in the case where one telephone/facsimile number commonly used for the telephone and the facsimile is designated to each user, while it is a facsimile number in the case where both a telephone number and a facsimile number are separately designated to each user.

Another object of the present invention is to provide a facsimile mail system in which received facsimile messages can be managed individually by respective persons without the necessity of inputting a special code representing "confidential" by a sender.

A further object of the present invention is to provide a facsimile mail system provided with a voice mail system in which each user can easily output the management information or journal information concerning the messages accumulated in the user's voice mail device on a facsimile device located in the neighborhood of the user.

According to the present invention, the facsimile mail system comprises: switching means having an input side connected to an outside telephone line and an output side connected to a plurality of telephones and at least one facsimile device; facsimile mail storage means connected to the output side of the switching means and having a plurality of storage regions; judgment and control means for judging whether a telephone signal received by the switching means is a voice signal or a facsimile signal and sending a transfer request to the switching means so as to connect the telephone signal to one of the telephones which is a destination of the telephone signal when the telephone signal is a voice signal and to connect the telephone signal to the facsimile mail storage means when the telephone signal is a facsimile signal; and means for selecting one of the storage regions specified by the destination of the telephone signal and for accumulating the facsimile signal connected to the facsimile mail storage means into the selected one storage region.

According to one embodiment of the present invention, the facsimile mail system further comprises: voice mail means connected to the switching means and having storage regions assigned to the respective telephones; means for accumulating a received telephone signal together with management information including predetermined items relating to the received telephone signal into one of the storage regions of the voice mail means assigned to a destination telephone to which the received telephone signal is to be connected when the received telephone signal is a voice signal and when the destination telephone generates no answer, or the destination telephone is busy, or a transfer of the telephone signal is set by the destination telephone; and means for converting the management information of the telephone signal accumulated in the storage region of the voice mail means assigned to the destination telephone into a facsimile signal, and outputting the facsimile signal to a selected one of the facsimile devices.

BRIEF DESCRIPTION OF THE DRAWINGS

FIG. 2 is a table showing telephone/facsimile numbers and mail box numbers corresponding thereto provided in the facsimile mail accumulating device;

FIG. 8 is a table showing facsimile numbers and mail box numbers corresponding thereto;

FIG. 10–12 show modifications of the first embodiment of FIG. 9;

FIG. 13 shows an example of the journal information as stored;

FIG. 14 shows an example of the journal information displayed in the facsimile device in the first embodiment of FIG. 9;

DESCRIPTION OF THE PREFERRED EMBODIMENTS

Figure 1:
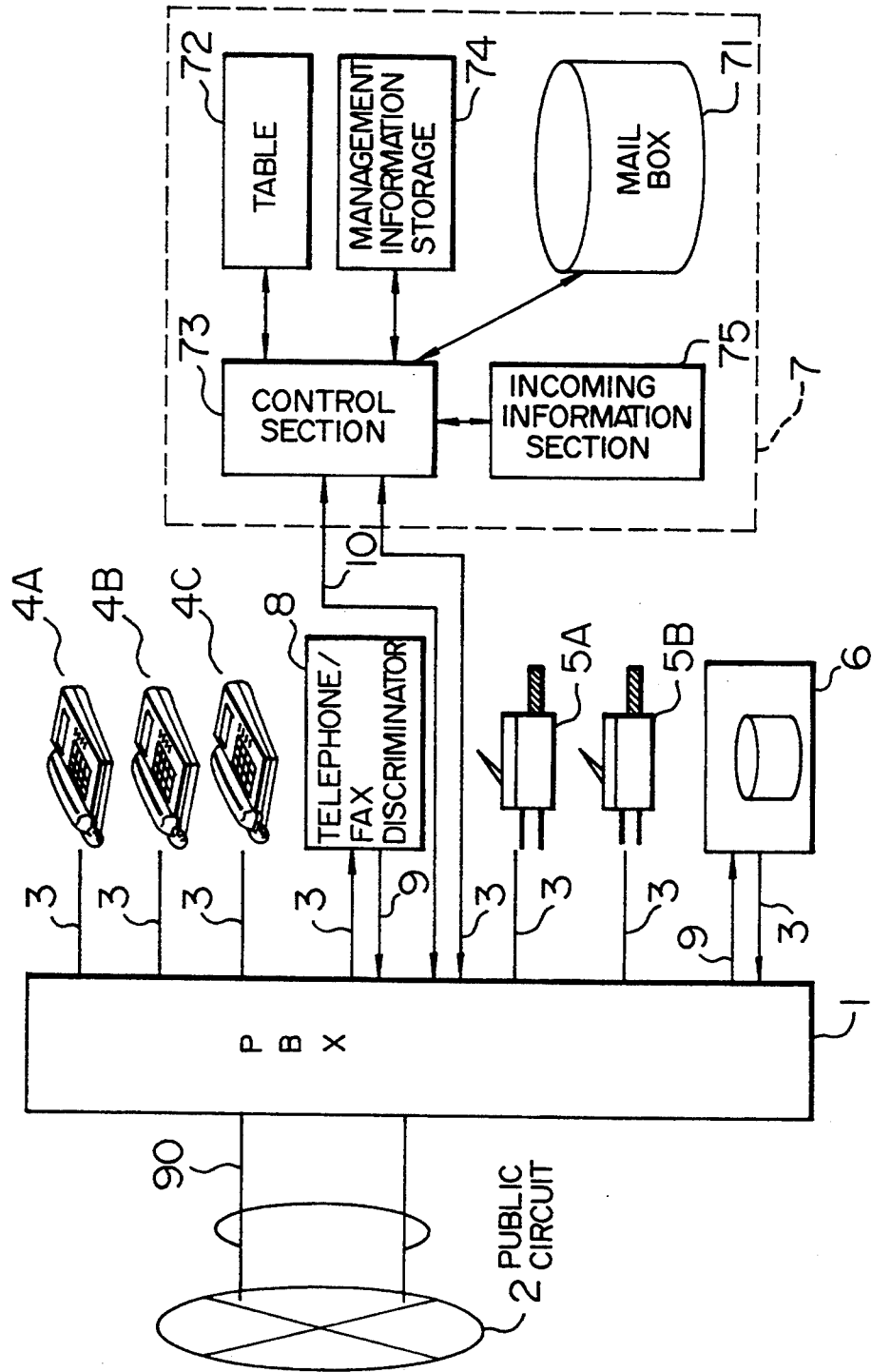
FIG. 1 is a diagram illustrating the configuration of a first embodiment of the present invention.

FIG. 1 shows the configuration of a first embodiment of the present invention. In this embodiment, the telephones connected to a private branch exchange (PBX), preferably an electronic switching system, have storage regions allotted thereto in a mail box provided to a facsimile mail accumulator so that one telephone number is commonly used for access to one of the telephones for transmitting voice message through the one telephone to a specific user and for access to one of the storage regions for transmitting image message or facsimile message through the one storage region to the same user. Thus, the same number will be printed on a name card of the user at respective areas for indication of telephone and facsimile numbers. A discriminator or judgment device is connected to the private branch exchange (PBX) and makes a judgment as to whether a received telephone signal is a voice signal to be connected to a particular telephone or a facsimile signal to be connected to particular facsimile device.

In FIG. 1, a plurality of telephones 4A, 4B, and 4C and a plurality of facsimile devices 5A and 5B are connected through receptive extension telephone lines 3 to the PBX 1 which is connected to an outside telephone line. A voice mail accumulator 6 and a facsimile mail accumulator 7 as intelligent functions are further connected to the PBX 1. The voice mail accumulator 6 includes storage regions allotted to the respective telephones so that a voice message for any telephone is stored in the storage region allotted to the telephone when a receiver of the telephone is absent, for example, and then the voice message is read out at a request of the telephone receiver and transmitted for communication. The facsimile mail accumulator 7 includes a mail box 71 having storage regions so that a facsimile signal is temporarily stored in one of the storage regions of the mail box 71, and then transmitted to a particular one of the facsimile devices connected thereto. By means of the facsimile mail accumulator 7, personal facsimile transmission, broadcast or multi-address calling can be easily carried out.

A telephone/facsimile judgment device or discriminator 8 for making a judgment as to whether a received telephone signal is a signal of a voice message or a signal of facsimile message is connected to an extension of the PBX 1.

Upon reception of incoming signals through extensions or an outside line, the PBX 1 first connects the incoming line to the extension 3 to which the telephone/facsimile discriminator 8 is connected, and simultaneously sends the incoming telephone signal to the telephone/facsimile discriminator 8. The telephone/facsimile discriminator 8 hooks off to check the existence of a CNG signal (which is sent from a facsimile device) in the signal sent through the connected line, and the telephone/facsimile discriminator 8 judges that the signal is derived from a facsimile device when the CNG signal is detected and that the signal is derived from a telephone when no CNG signal is detected, and the telephone/facsimile discriminator 8 sends a discrimination signal to the PBX 1 through an information line 9. In synchronism with the above operation, the telephone/facsimile discriminator 8 informs the PBX 1 of the previously stored telephone number of the transfer destination, that is, the original destination number. The telephone/facsimile discriminator 8 sends back an audible ringing signal or a specific message to a caller in order to prevent the connected telephone circuit from continuing silent during the discriminating operation.

In the case where the discrimination signal produced from the telephone/facsimile discriminator 8 indicates a telephone signal, the PBX 1 connects the line connected to the discriminator 8 to the extension 3 of the telephone having the destination number informed by the telephone/facsimile discriminator 8. If no receiver exists when the line is connected to a destination one of the telephones 4A through 4C, the telephone signal is automatically transferred to the voice mail accumulator 6 after repeating the calling predetermined times. In this embodiment, by the above transfer operation, it is possible to prevent such a trouble that the line is once connected to the telephone/facsimile discriminator 8 and therefore the line is made to be in an off-hook state with respect to the transmission-side telephone so that the charge thereof must be paid regardless of that any message can not be remained but only calling is repeated.

When the discrimination signal indicates a facsimile signal, the PBX 1 connects the line connected to the discriminator 8 to the facsimile mail accumulator 7 and informs the facsimile main accumulator 7, through an information line 10, of the destination number informed by the telephone/facsimile discriminator 8. The facsimile mail accumulator 7 has a table 72 showing the correspondency between the destination telephone/facsimile numbers and the respective addresses or numbers of storage regions of the mail box in the facsimile mail accumulator 7 as shown in FIG. 2. A control section 73 of the facsimile mail accumulator 7 searches for the table 72 to determine the mail box number i.e. the address of the storage region of the mail box 71 corresponding to the destination telephone/facsimile number informed through the information line 10 and stores the facsimile number of the circuit connected to the storage region of the determined mail box number. At the same time, the control section 73 of the facsimile mail accumulator 7 stores in a management information storage section 74 management information including the point of time of reception, the transmission side information, etc. Upon completion of the above operation, the line to the facsimile mail accumulator 7 is cut so that the facsimile mail accumulator 7 is separated from the PBX 1. An incoming information section 75 generates calling for a selected one of the telephones 4A through 4C having the received destination telephone number.

When the incoming information section 75 is connected to the selected one of the telephones 4A through 4C having the destination telephone number through the PBX 1, the incoming information section 75 outputs the history or information of the mail box including the number of incoming messages, the points of time of reception, the information of the caller's sides, etc. by synthesized voices. The information may be displayed in a form of an image on the corresponding facsimile device.

The receiver who receives the incoming message calls the facsimile mail accumulator 7 from a nearest one of the facsimile devices 5A and 5B and inputs the receiver's mail box number, so that the receiver gets the facsimile mail stored in the mail box. In this case, if the receiver is obliged to input a corresponding ID number as shown in FIG. 2, it is possible to prevent the facsimile mail addressed to him from being read by any other person similarly to a personal facsimile mail.

Although a case where the incoming information section 75 informs of the incoming signal by means of synthesized voices has been described in the above embodiment, it is possible to inform of incoming signal by means of turning-on of a lamp on the telephone through information line 10 or by a pager. Alternatively, the information may be taken out from the mail box of the facsimile mail accumulator 7 at a request delivered not only from the facsimile device 5 (5A, 5B or 5C) but also from the telephone 4 (4A, 4B or 4C).

A second embodiment of the present invention will be described hereunder.

Figure 3:
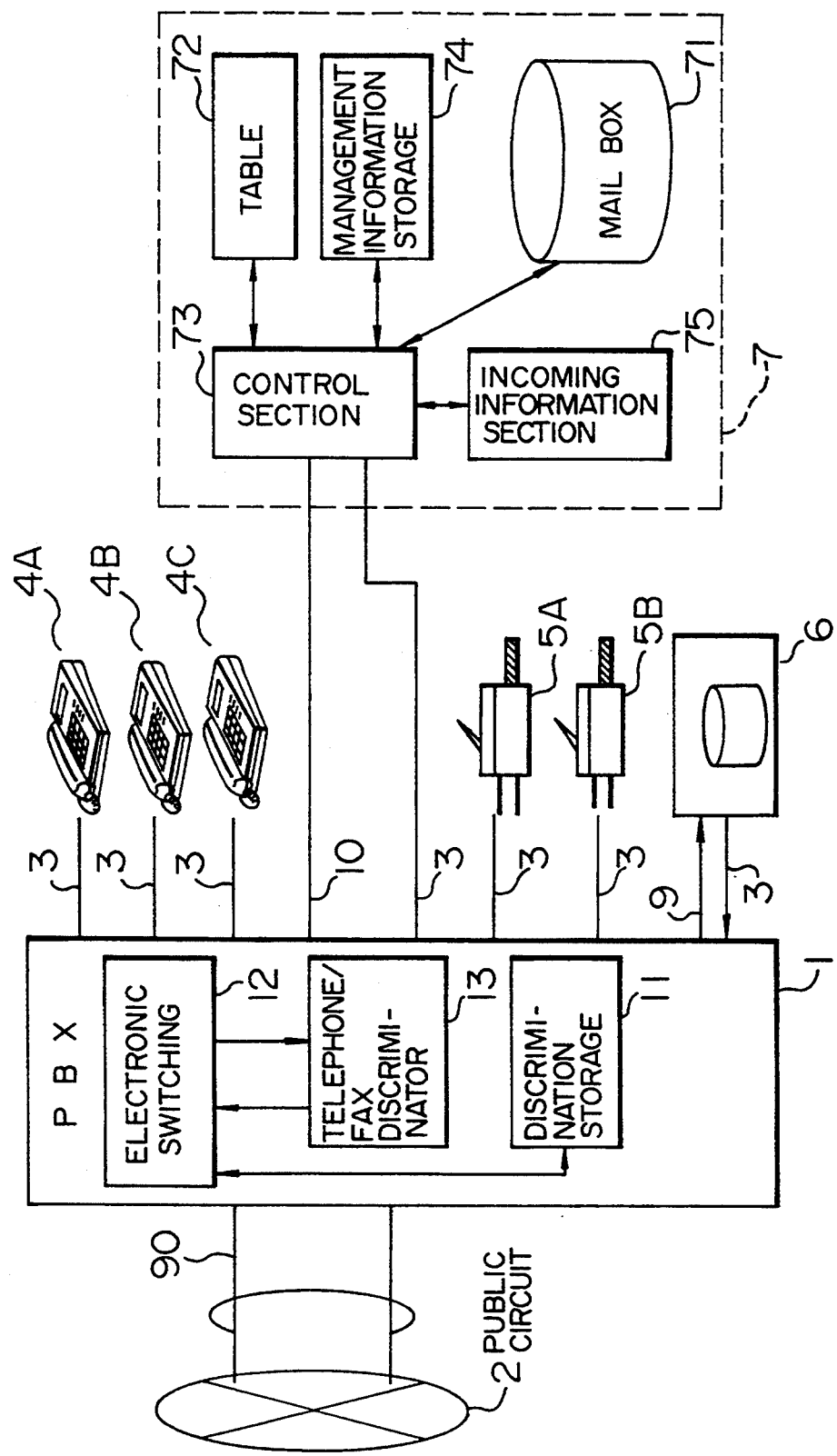
FIGS. 3–7 are diagrams illustrating the respective configurations of second through sixth embodiments of the present invention.

FIG. 3 is a view showing the second embodiment of the present invention. In this embodiment, the telephone/facsimile judgment device or discriminator is incorporated in the PBX.

An electronic switching section 12 and a telephone/facsimile discriminator section 13 are incorporated in the PBX 1. If a signal comes from an extension or an outside line, the electronic switching section 12 temporarily connects the signal to the telephone/facsimile discriminator section 13 so as to establish a line connection state. In such a line connection state, a CNG signal is sent from the transmission side when the transmission side is a facsimile device, so that the telephone/facsimile discriminator section 13 can discriminate between telephone and facsimile signals by detecting the CNG signal. If the detection result proves that the incoming signal is a telephone signal, the PBX 1 connects the incoming line to a line 3 of a telephone 4 (4A, 4B or 4C) having a destination telephone number stored in a destination storage section 11. If the detection result proves that the incoming signal is a facsimile signal, the PBX 1 connects the incoming line to a line 3 of the facsimile mail accumulator 7 and simultaneously informs the destination telephone number to the facsimile mail accumulator 7 through a signal line 10. The succceeding operation is similar to that of the first embodiment.

A third embodiment of the present invention will be described hereunder.

Figure 4:
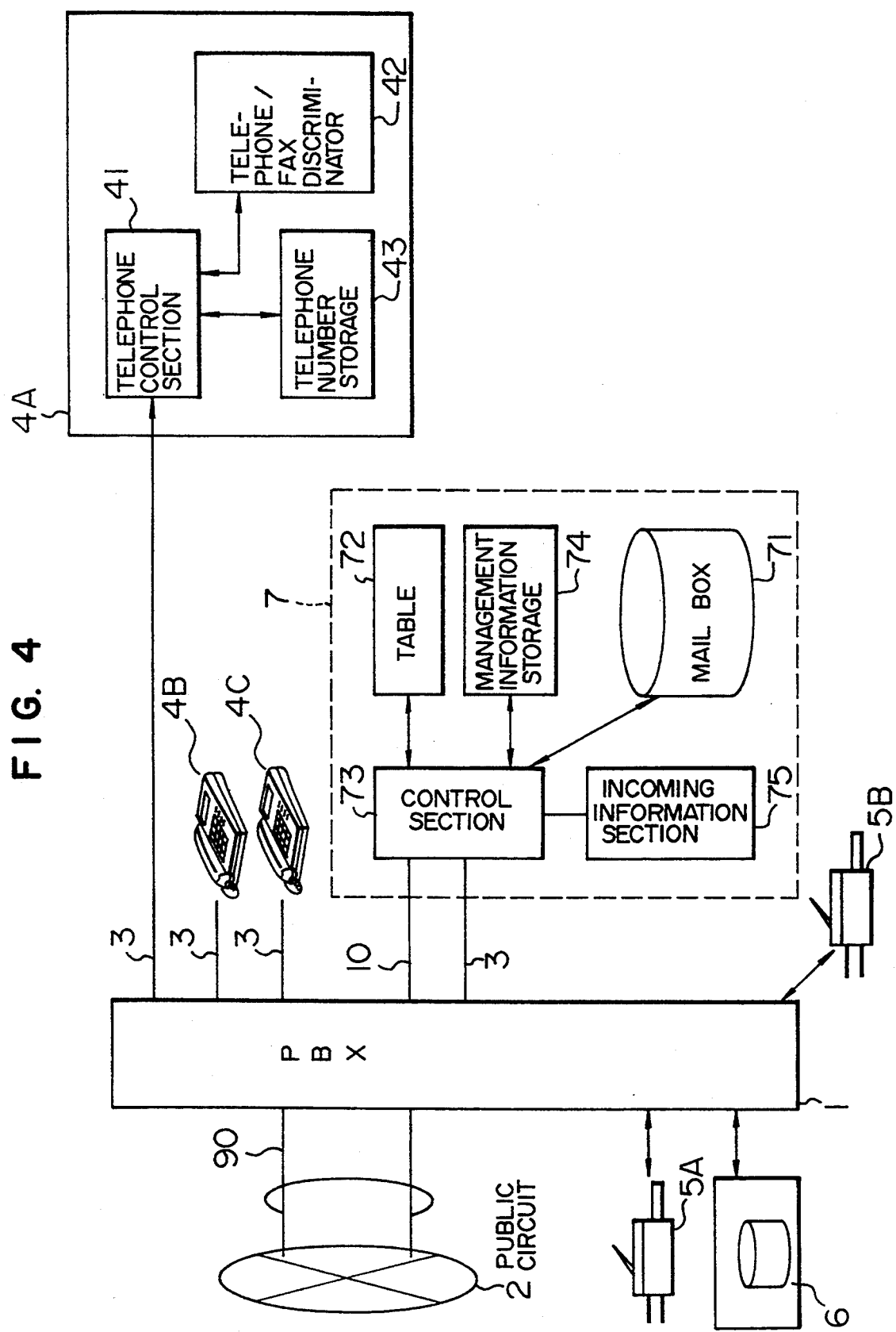

FIG. 4 is a view showing a third embodiment of the present invention. In this embodiment, the telephone/facsimile judgment device or discriminator is incorporated in each telephone.

As shown in FIG. 4, the facsimile mail accumulator 7 is connected to the PBX 1. Telephones 4A, 4B, and 4C connected to the PBX 1 have the same structure. Each of the telephones 4A through 4C has a telephone control section 41, a telephone/facsimile discrimination section 42, and a telephone number storage section 43. The telephone number storage section 43 stores a telephone number of the facsimile mail accumulator 7 and a telephone number assigned to that telephone. When an incoming line is connected to any of the telephones 4A through 4C, the telephone/facsimile discrimination section 42 judges whether the incoming signal is an ordinary telephone signal or a facsimile signal. In the case of an ordinary telephone signal, the telephone control section 41 generates a calling sound so that the telephone acts as it is. In the case of a facsimile signal, the incoming signal is transferred to the facsimile mail accumulator 7 through the transfer function of the PBX 1. At this time, the telephone 4 (4B, 4B or 4C) sends a transfer code together with the telephone number of the facsimile mail accumulator 7 and the telephone number of that telephone which are stored in the telephone number storage section 43. The PBX 1 connects the line to the facsimile mail accumulator 7, and the facsimile mail accumulator 7 checks a table 72 for determining the mail-box number corresponding to the telephone number of the telephone thereby to store the facsimile message in the region having the mail-box number as determined. The succeeding operation is similar to that of the first embodiment. In this embodiment, if the mail-box number of the facsimile mail accumulator 7 allotted to that telephone is stored in place of the telephone number of that telephone in the telephone number storage section 43, it is unnecessary to prepare the table 72 in the facsimile mail accumulator 7 for determining the mail-box number corresponding to the telephone number of that telephone.

A fourth embodiment of the present invention will be described hereunder.

Figure 5:
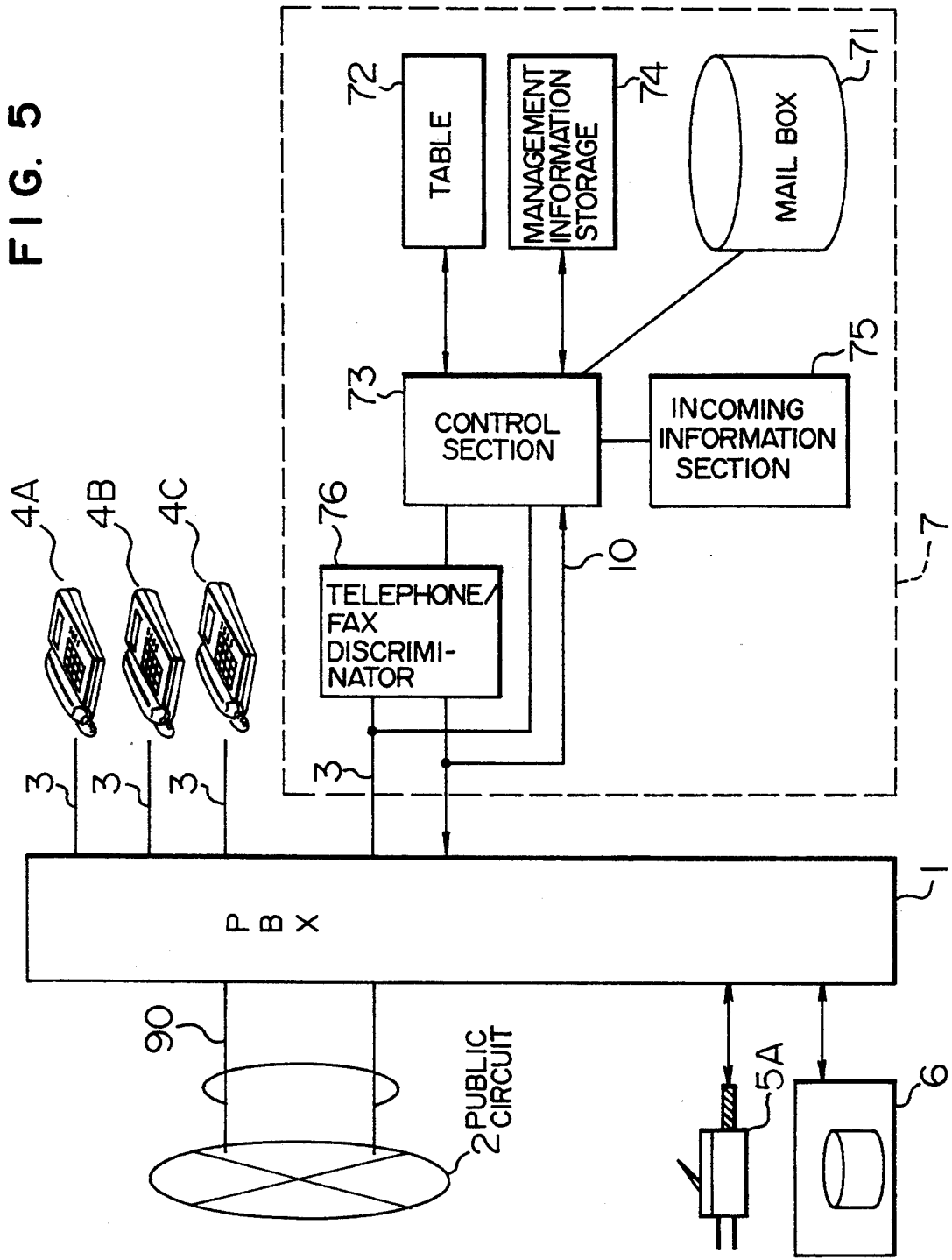

FIG. 5 is a view showing the fourth embodiment of the present invention. In this embodiment, the telephone/facsimile judgment device or discriminator is incorporated in the facsimile mail accumulator.

That is, the facsimile mail accumulator 7 has a telephone/facsimile discrimination section 76. The PBX 1 once connects each incoming signal to the facsimile mail accumulator 7 and simultaneously sends a destination telephone/facsimile number addressed by the caller to the facsimile mail accumulator 7 (through an extension 3 or an information line 10). When the result of the discrimination of the telephone/facsimile discrimination section 76 proves that the incoming signal is an ordinary telephone signal, this fact and the previously stored destination telephone/facsimile number to which this telephone signal is to be transmitted are informed to the PBX 1 through the signal line 10 so that the line is connected to the extension of the telephone of the destination telephone number. When the result proves that the incoming signal is a facsimile signal, a table 72 is searched for determining the mail-box number corresponding to the telephone/facsimile number informed from the PBX 1 and the facsimile mail is stored in the storage region of the mail box 71 having the mail-box number as determined. The succeeding operation is similar to those of the embodiments described above.

A fifth embodiment of the present invention will be described hereunder.

Figure 6:
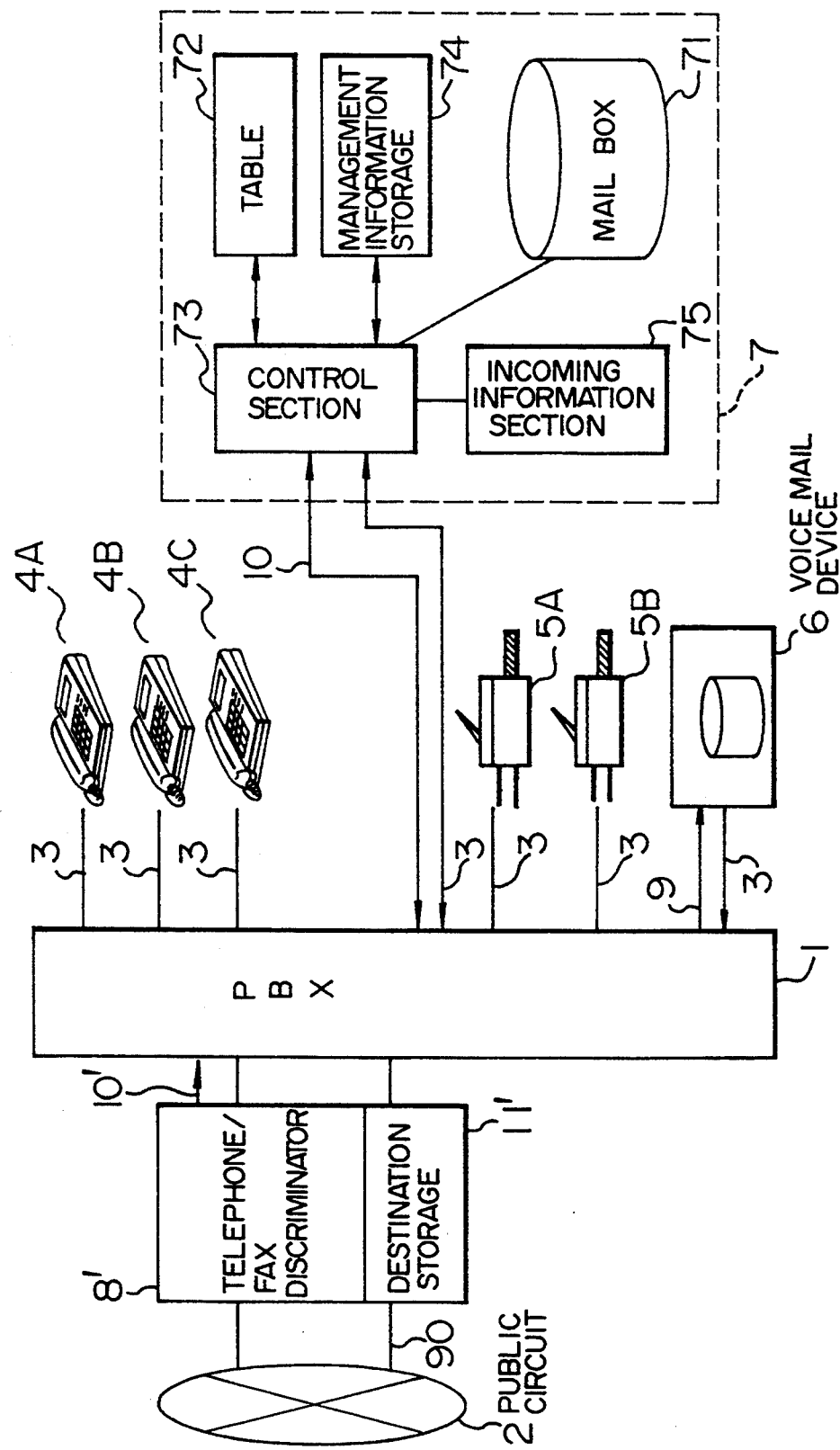

FIG. 6 is a view showing the fifth embodiment of the present invention. In this embodiment, the telephone/facsimile judgment device or discriminator is provided between the outside circuit and the PBX.

That is, a telephone/facsimile discriminator 8' is provided between the public or outside line 2 and the PBX 1. Upon reception of a call through the public circuit 2, the telephone/facsimile discriminator 8' is once brought into an off-hook state. At this time, the destination telephone number is stored in a destination storage section 11'. The result of discrimination is sent to the PBX 1 through a signal line 10', so that the outside line is connected to the PBX 1. The PBX 1 connects the line to a telephone or a facsimile mail accumulator 7 in accordance with the result of discrimination.

In the embodments described above, when a call is generated for a telephone, the judgment or discrimination means judges whether an incoming telephone signal is a voice signal or a facsimile signal. When the result of discrimination of the discrimination means proves that the incoming telephone signal is a voice signal, the incoming line is connected to the destination telephone through the PBX or a switching system. When the result of discrimination proves that the incoming signal is a facsimile signal, the incoming line is connected to the facsimile mail accumulator so that the received facsimile signal is stored in a storage region assigned to the destination telephone in the facsimile mail accumulator. The facsimile mail accumulator outputs an indication of the existence of facsimile mail reception to a selected one of facsimile devices allotted to that telephone or informs the above fact by means of a voice, a lamp, or the like. A receiver who knows the existence of the facsimile mail addressed to him issues a request to the facsimile accumulator through the telephone so that the information stored in the storage region allotted to the telephone is outputted through the facsimile device, or the facsimile mail is received by the facsimile device by polling or push-button input from the facsimile device so that the information stored in the storage region allotted to the telephone is outputted through the facsimile device. Further, in the case where a plurality of facsimile devices are provided, the information may be printed out through a nearest one of the facsimile devices so that the facsimile output can be quickly obtained.

In any of the embodiments as described above, the telephone number allotted to each of the telephones connected to the PBX is commonly used for transmitting a facsimile message to a user of that telephone.

Figure 7:
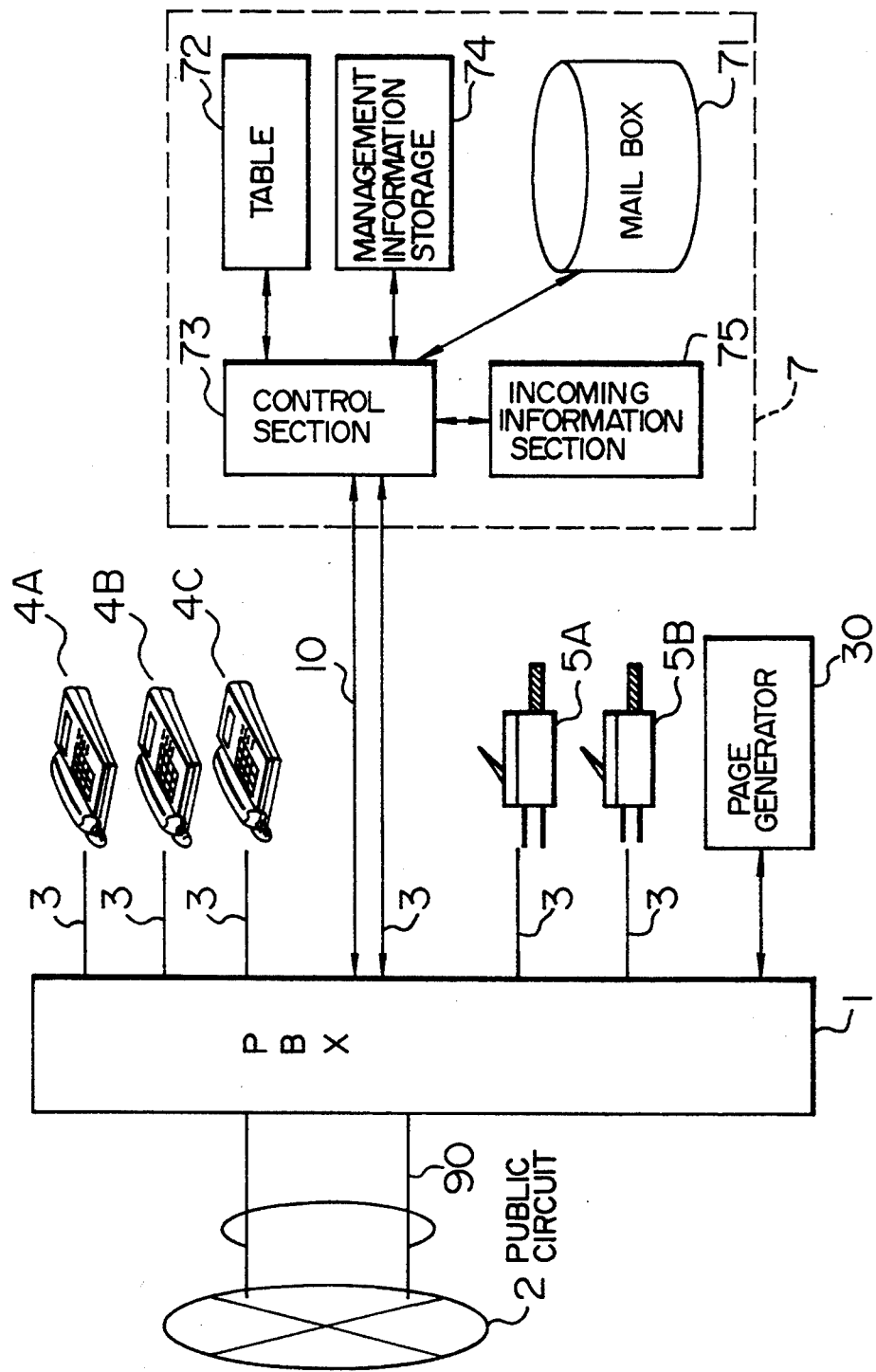

Referring to FIG. 7, a sixth embodiment of the present invention will be described hereunder. In this embodiment, a telephone number and an facsimile number are determined independently of each other. Accordingly, the telephone number used for transmission of a telephone mail is different from the facsimile number used for transmission of a facsimile mail, so that any means for judging whether a received signal is a telephone mail or a facsimile mail is not required.

In FIG. 7, the same reference numbers as those in FIGS. 1 through 6 indicate the same or similar components.

A facsimile mail accumulator 7 is provided with mail boxes (or storage devices) respectively assigned to users (individuals or groups), and different facsimile numbers are assigned to the respective mail boxes. Those facsimile numbers have no relation with facsimile devices 5 (5A and 5B). Upon reception of a mail from an extension or an outside line, the PBX 1 connects the mail to the facsimile mail accumulator 7 when the calling number is one of the above facsimile numbers, and simultaneously informs the facsimile number to the facsimile mail accumulator 7 through a telephone line 3 or an information line 10.

Referring to a table 72 as shown in FIG. 8, the facsimile mail accumulator 7 accumulates the incoming mail into the mail box corresponding to the facsimile number. The facsimile accumulator 7 informs the reception and accumulation of the facsimile mail to the owner of the mail box in such a way as previously determined by the owner of the mail box, for example, turning-on of a lamp on a telephone, informing with a voice, outputting a list on a particular facsimile device, for contact informing through a pager, or the like. In the case of turning-on of a lamp on a telephone or informing through a pager by use of a pager generator 8, the facsimile mail accumulator 7 informs the PBX 1 of the above fact. In the case of informing with a voice, the facsimile mail accumulator 7 informs a particular telephone for contact through synthesized voice of information such as incoming points of time and the number of the accumulated mails. The above information relating to all the mails in each mail box may be obtained by the guide of the synthesized voice. Alternatively, a table as shown in FIG. 8 may be provided in a suitable device (for example, the PBX) other than the facsimile mail accumulator 7, so that the suitable device informs accumulation of facsimile mails to an owner of the mail box. When accumulation of facsimiles mail is informed to the owner of any mail box, the owner can generate, through operation of a telephone or an incorporated telephone of a facsimile device, a request for outputting the accumulated mail to a desired output apparatus such as the facsimile device or the like. Further alternatively, the accumulated mail may be taken out through polling from a facsimile device to which it is desired to output the mail. Alternatively, it is possible to preset such that at a lapse of predetermined time after reception and accumulation of incoming mail, the mail is automatically outputted through a specified facsimile device. It is possible to access to each of the facsimile devices 5 (5A, 5B) from the facsimile mail accumulator 7 by using any of an extension number and an outside telephone number allotted thereto.

In the sixth embodiment, upon reception of an incoming signal calling a facsimile number determined for facsimile transmission, the PBx connects the incoming signal to the facsimile mail accumulator and simultaneously informs the called facsimile number to the facsimile mail accumulator. The facsimile mail accumulator automatically accumulates an incoming message in a specified mail box corresponding to the informed facsimile number, so that it is unnecessary for the sender or caller to make any troublesome operation. Further, the facsimile mail accumulator or the PBX informs the incoming to the owner of the mail box, so that the owner can early know the arrival of the incoming mail. Further, the owner can get the mail through the mail output operation by the owner himself while keeping the mail secret from any other person. Further, when a plurality of mail boxes are prepared with respective different facsimile numbers so that the telephones have individual facsimile mail boxes, respectively, the system can be used as if the owner of each telephone has his own facsimile-device.

In the foregoing embodiments, there is a feature mainly in the configuration of the facsimile accumulator, while as the voice mail device a conventional one may be used. It is however desirable to improve the voice mail device in various ways. Referring to FIGS. 9 through 18, description will be made as to first, second, third, and fourth embodiments of the improvement of the voice mail device. Although the improved voice mail device is used for the voice mail device in the embodiments as described with reference to FIGS. 1 through 8, it may be used independently of the foregoing embodiments.

Figure 9:
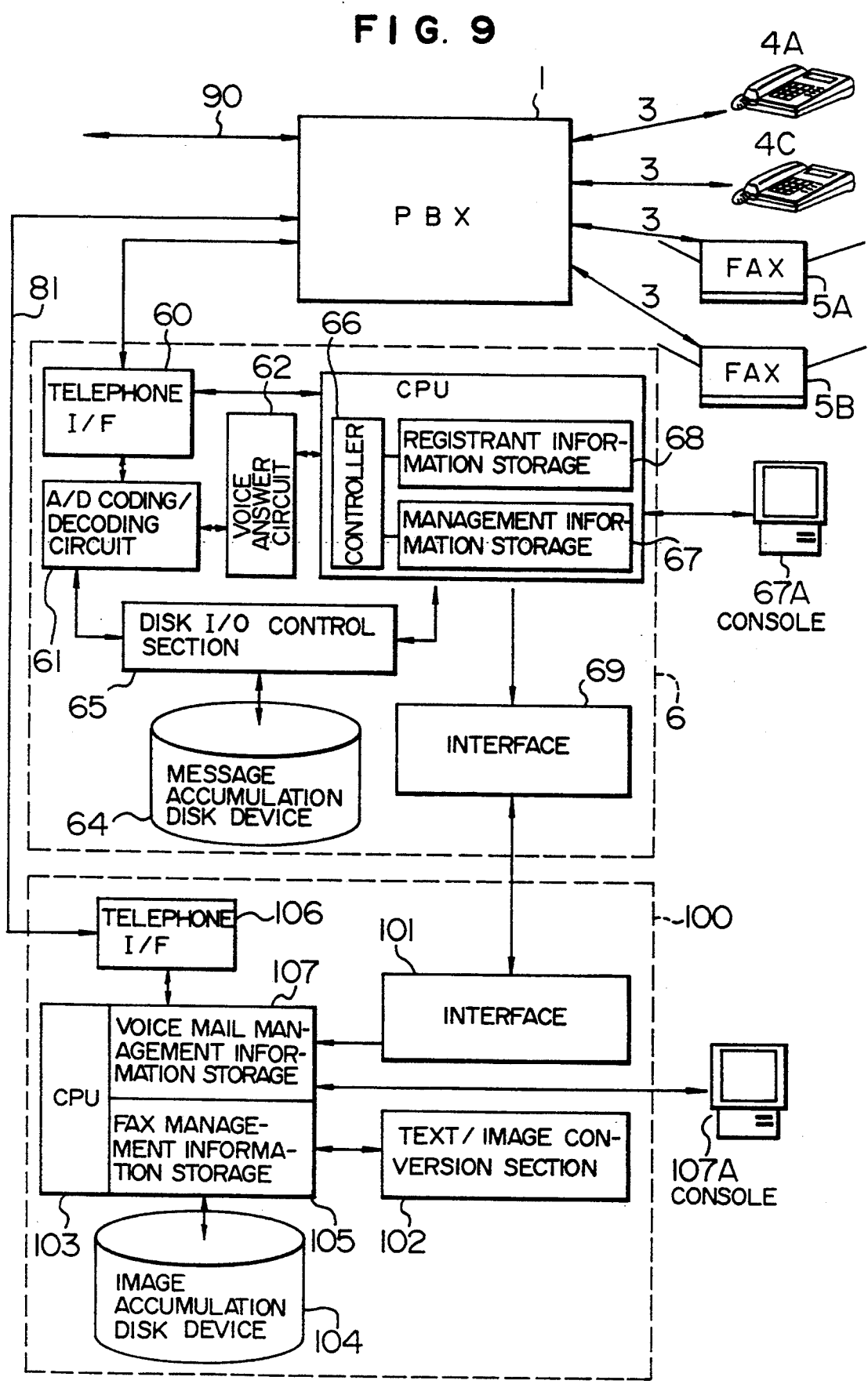
FIG. 9 is a diagram illustrating the configuration of a first embodiment of the voice mail device used in the present invention.

In FIGS. 9 through 18, the same reference numerals as those of FIGS. 1 through 8 indicate the same or similar components. In the first embodiment in improvement of the voice mail device according to the present invention, the improved voice mail device 6 includes, as shown in FIG. 9, a telephone interface circuit (telephone I/F) 60 for connection to the PBX 1, an A/D coding/decoding circuit 61 for converting an analog signal on a telephone line into a digital signal or vice versa, a voice answer device 62 for generating a voice message, a message accumulation disk device 64 for accumulating voice messages or the like, a disk input/output (I/O) control section 65 for controlling the input/output of the disk device 64, a CPU 63 for managing the whole voice mail device, and an interface circuit 69 for controlling the input/output transmission between the voice mail device 6 and an facsimile accumulation switching system 100. The CPU 63 is provided with a controller section 66, a management information storage section 67 for storing management information of voice mails to be stored in the disk device 64, a console 67A, and a registrant information storage section 68 for storing addresses or numbers of the storage regions of the disk device or the mail boxes assigned to the respective telephone numbers corresponding facsimile numbers, passwords, belonging sections and names of the respective owners and so on.

The facsimile accumulation switching system 100 includes an interface circuit 101, a telephone interface (telephone I/F) circuit 106, a text/image conversion section 102 for converting text data into image information, a CPU 103 for performing whole control, an image accumulation disk device 104 for storing facsimile image information, a facsimile management information storage section 105, a voice mail management information storage section 107 for storing voice mail management information sent from the voice mail device 6 as output data, and a console 107A.

When a call is generated through an extension telephone 4A to another extension telephone 4B, the telephone (line) number "2222" of the extension telephone 4B is sent from the extension telephone 4A to the PBX 1. Upon reception of the call request from the extension telephone 4A, the PBX 1 connects the line "1111" of the telephone 4A to the line "2222" of the telephone 4B. As a result, a line between the telephones 4A and 4B is established for communication with each other. When a particular person is present in the telephone 4B, an ordinary telephone call is carried out. If the other side is absent or busy, on the contrary, the telephone call is transferred to the telephone number, for example, "3333" of the voice mail device 6 by utilizing the transferring function of the PBX 1. It is a matter of course that the telephone number "3333" of the voice mail device 6 may be dialed from the telephone 4A so that the voice mail device 6 is directly called.

Since the voice mail device 6 and the PBX 1 are directly coupled to each other, the PBX 1 sends the other side telephone number, for example, "2222" inputted or dialed from the telephone 4a to the voice mail device 6 to thereby select the mail box "2222" of the voice mail device 6.

In the system of this embodiment, when the telephone number "3333" of the voice mail device 6 is given to the PBX 1 or when transfer of the call to the telephone number "3333" by the PBX 1 is requested, the PBX 1 judges whether the telephone call is derived from an extension or an outside line, and generates a discrimination code AA as a result of discrimination. When the discrimination code AA is "00" representing an extension, the PBX 1 produces the discrimination code AA followed by the telephone number "1111" of the call side to the voice mail device 6.

When the discrimination code AA is "11" representing an outside-line, on the contrary, the PBX 1 produces only the discrimination code AA to the voice mail device 6.

The voice mail device 6 performs voice guidance for service menu by using the voice answer circuit 62, and message transmission is selected. When the connected line is an extension, the voice mail device 6 sends a voice message of "push '1' when call-back is necessary, push '2' when call-back is not necessary, and push '3' in case of urgency", and waits for answer of a priority code BB representing "1", "2" or "3". When the priority code BB is answered, the voice mail device 6 sends a voice message of "input a message", and waits for entry of a voice message. Upon completion of the entry of a voice message, the discrimination code AA, the caller's telephone number "1111", the name, and the priority code BB are stored in the management information storage section 63, and the voice message is stored in a region of the disk device 64 assigned to the telephone 4B as a mail box therefor. At the same time, management data such as reception time information and the like are stored in the management information storage section 63. Management data to be stored in the management information storage section 63 of the voice mail device 6 are in the form of coded data such as text data or the like, and the contents thereof are as follows.

1) Outgoing/incoming information

Information on each of messages outgoing from or incoming to a mail box of each user and including a code indicating discrimination of outgoing or incoming, date of the message, the other-side name and telephone number and the message length (time).

2) Message distribution information

Confirmation as to whether the message transmitted to the other-side person has been taken out of the mail box or not by the person.

3) Information on result of multi-address calling

Confirmation as to whether the other-side persons have received or not a message transmitted by multi-address calling.

4) List for multi-address calling

Information on the other-side groups as registered in multi-address calling including the name and number of each group and the names and telephone numbers of persons of each group.

5) Abbreviated/one-touch dial list

Information on abbreviated/one-touch dial numbers names and telephone numbers of the concerned persons.

6) Information on communication fees.

7) Mail box status information

8) System information

When the outside-line is connected, the controller section 66 of the voice mail device 6 sends the voice message of "push '1' when call-back is necessary, push '2' when call-back is not necessary, and push '3' in case of urgency", and waits for answer of the priority code BB. When the answered priority code BB is "1", the voice mail device 6 sends the voice request message of "input the telephone number", and waits for answer of the other-side telephone number. When the answered priority code BB is "2" or "3", on the contrary, the above step is omitted. Upon receiving the answer, the voice mail device 6 sends the voice message of "input a message" and waits for entry of a voice message. When the entry of a voice message is completed, the voice mail device 6 stores the discrimination code AA, the otherside telephone number, for example, "23-1234" and the priority code BB in the management information storage section 63, and the voice message in the mail box of the telephone 4B.

Figure 15:
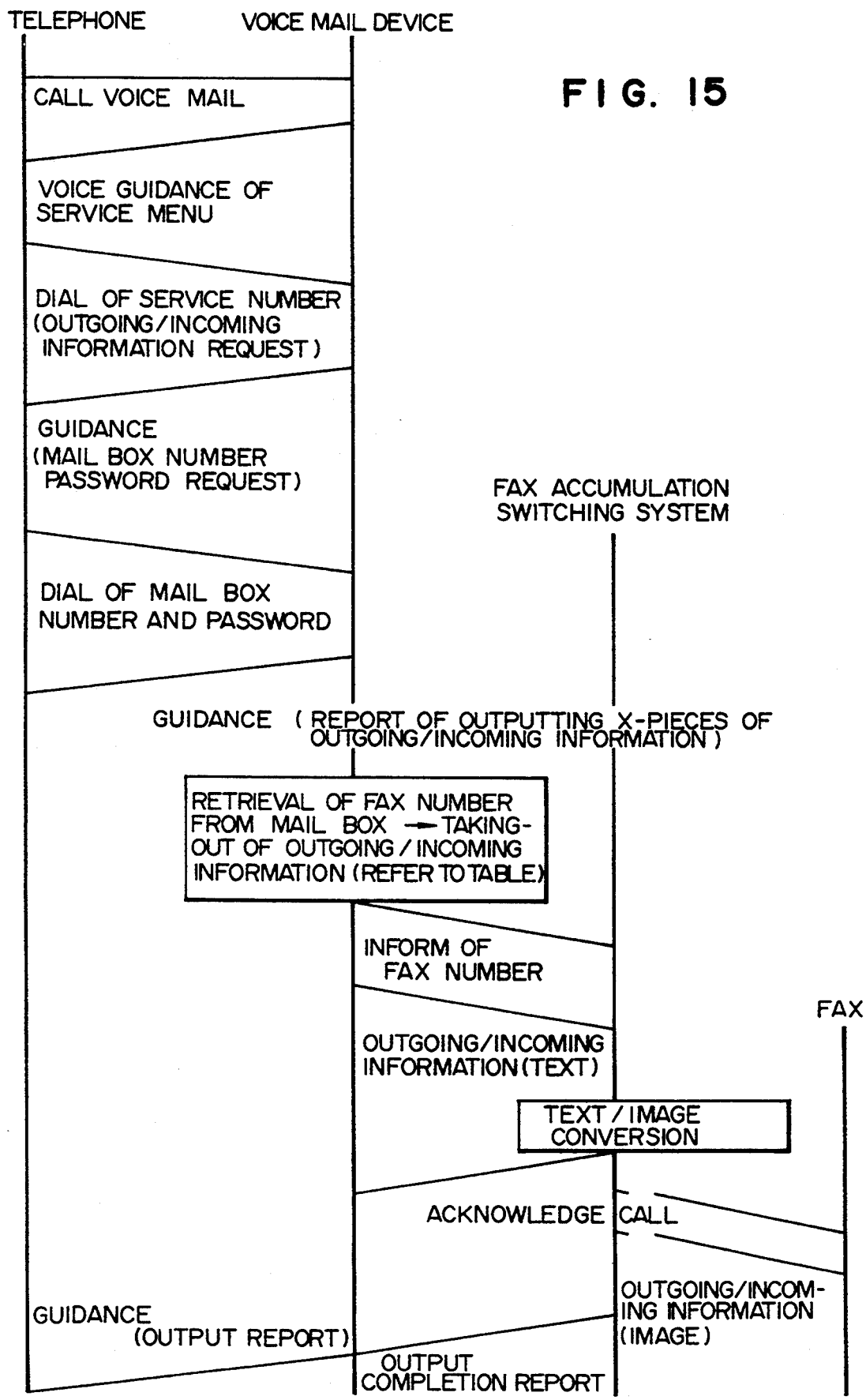
FIG. 15 is a flow chart showing the information reading-out operation in the first embodiment of FIG. 9.

Next, referring to FIG. 15, description will be made as to the operation for outputting journal information (management information).

The output of journal information may be performed every time it is required or automatically at a predetermined schedule or time by the voice mail device 6.

When the output of journal information is performed every time it is required, the telephone number "3333" is dialed from the telephone 4B to thereby call the voice mail device 6 through the PBX 1. In the case where a facsimile-output of management data is selected according to the voice guidance of service menu, journal information is sent to one of the facsimile devices 5 (5A or 5B) which may be indicated by the telephone 4B or preliminarily set for the telephone.

When the voice mail device 6 automatically performs the output of journal information at predetermined schedule or time, on the contrary, the voice mail device 6 monitors the management information output time in a table, as shown in FIG. 13, stored in the registrant information storage section and outputs the management information of the mail box by facsimile at the time. This operation will be explained more detail below.

After it is decided whether the information is to be outputted periodically at a predetermined schedule or at a request from a telephone, the voice mail device 6 refers to the item of the user's facsimile number in the table of FIG. 13 as stored in the registrant information storage section 68 and determines the facsimile number of the receiving or other-side facsimile device 5 (5A or 5B). The voice mail device 6 reads the management data such as the discrimination code AA and the other-side telephone number "1111", the priority code BB and the reception time information which are stored in the management information storage section 67 correspond respectively to the mail box number of the telephone 4B and edits the data in a predetermined format. At this time, the voice mail device 6 refers to the section name table in the registrant information storage section 68, and displays the section name when the other-side telephone number is registered in the table. Further, in the case where a telephone is assigned to each person, the voice mail device 6 refers to the user's name list in which the other-side names are listed, and displays the corresponding other-side name.

The edited management data are sent to the voice mail management information storage section 107 of the facsimile accumulation switching system 100 through the interface circuits 69 and 101. The facsimile accumulation switching system 100 is provided with the facsimile management information storage section 105 for storing its own facsimile management information so that the facsimile management information is converted into image information by the text/image conversion section 102 when desired to be outputted through facsimile transmission. In this embodiment, by utilizing the above function, management data stored in the voice mail management information storage section 107 are converted into image information by the text/image conversion section 102, and sent to a facsimile mail box provided in the image accumulation disk device 104. Upon completion of storage into the facsimile mail box, the other-side facsimile device 5 (5A or 5B) is called from the facsimile accumulation switching system 100 through the interface circuit 106, so that line connection between them is made through the PBX 1, the image data are outputted from the facsimile mail box and the voice mail management data are supplied to the facsimile device 5 (5A or 5B). Next, description will be made of the operation in the case where the information is facsimile-outputted from the facsimile device 5 at a request of the concerned telephone. In this case, since the selected facsimile device 5 (5A or 5B) is directly connected to the FAX accumulation switching system 100, it is not necessary to refer to the table of the user's facsimile numbers as described above. After a call is generated from the facsimile device 5 (5A or 5B) to the facsimile accumulation switching system 100 and line connection is made between them, the facsimile device 5 sends out a code indicating that the call is for a polling request and a code, for example, "#" indicating that the polling request is neither for image information nor for facsimile management information stored in the facsimile mail but for voice mail management information. Then the mail box number to be called and, if necessary, the password are sent from the facsimile device 5 (5A or 5B). By the above operation, management data stored in the voice mail management information storage section 107 of the facsimile accumulation switching system 100 are converted into image information by the text/image conversion section 102, and the converted image information is sent to the facsimile device 5 (5A or 5B).

In the facsimile accumulation switching system 100, various kinds of management information in the form of text data are stored in the facsimile management information storage section 105 in the same manner as in the voice mail device 6. When the information is to be transmitted to a user, the information is converted into image data through the text/image converter and transmitted to the facsimile device. In this embodiment, the text/image conversion section 102 of the facsimile accumulation switching system 100 is utilized so that voice mail management information is transmitted from the voice mail device 6 in the form of text data through the interface circuit 69 to the facsimile accumulation switching system 100 which receives the text data through the interface circuit 101 and converts the text data into image data, and thereafter transmits the image data in the form of signals arranged according to the facsimile data transmission standard to the facsimile device. It is therefore unnecessary to provide an additional text/image conversion section.

In the case where the voice mail device 6 automatically outputs journal information at a predetermined time or schedule, the voice mail device 6 refers to the management information storage section 67 at the predetermined time as indicated by a suitable timer (not shown), for example, just before the office work starting time, and successively supplies journal information associated with a mail box in which the message is stored, together with the facsimile number of the output-side facsimile device stored in the registrant information storage section 68 to the facsimile accumulation switching system 100. In the facsimile accumulation switching system 100, the journal information is converted into image data by the text/image conversion section 102 every time the journal information is stored into the voice mail management information storage section 107 and the image data is then transmitted to the predetermined facsimile device 5 (5A or 5B).

In the case where the facsimile accumulation switching system 100 automatically outputs journal information, on the other hand, the controller section 66 of the voice mail device 6 takes out the desired data from the management data stored in the management information storage section 67 every time a message is stored in the mail box of the voice mail device 6, edits journal information from the taken-out data, and then transfers the journal information to the voice mail management information storage section 107 of the facsimile accumulation switching system 100 through the interface circuits 69 and 101. The journal information includes data of the management information output time in the table stored in the registrant information storage section 68 as shown in FIG. 13. Then, the time is monitored by the CPU 103 of the facsimile accumulation switching system 100, and when the management information output time is reached, journal information corresponding to the mail box for the voice mail is converted into image data by the text/image conversion section 102, and the image data is transmitted to the facsimile device 5 (5A or 5B). In this case, alternatively, the operation may be performed in such a manner that: the journal information is not necessarily transmitted to the facsimile accumulation switching system 100 every time a message is stored in the mail box of the voice mail device 6; but the time is monitored by the CPU 103 of the facsimile accumulation switching system 100 so that a journal information transfer request is sent to the voice mail device 6 at the management information output time and then the transferred journal information is converted into image data by the text/image conversion section 102 and transmitted to the facsimile device 5 (5A or 5B). Data such as the management information output time of the registrant information storage section 68, the section name, and the like are inputted through the console 107A and stored into the respective storage sections. FIG. 14 shows an example of the output from the facsimile device.

When call-back is required, a predetermined mark is displayed in an area for the mark together with the other-side telephone number and name. Further, also the information of discrimination between extension and outside-line is displayed.

Description has been made of the case where journal information is sent to one of the facsimile devices 5 (5A or 5B) which is preset for each telephone. In the case where the Journal information is outputted at a request of an user, the user is asked to input, together with the request, the facsimile number of a selected facsimile device so that the journal information is transmitted, to the selected facsimile device.

Next, referring to FIGS. 10 through 12, description will be made as to modifications of the above embodiment.

Figure 10:
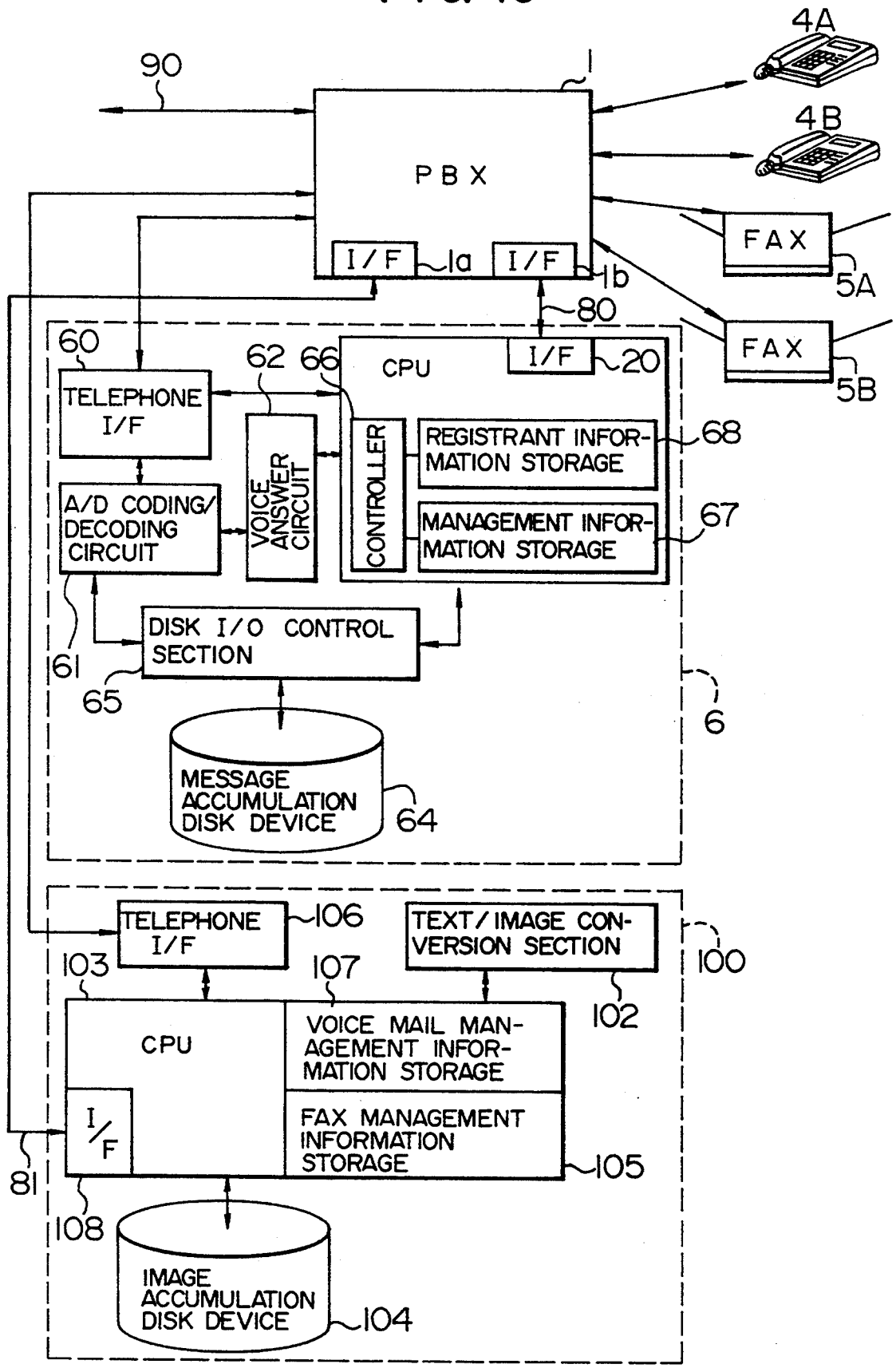

The modification of FIG. 10 is different from the embodiment of FIG. 9 in that the transmission of voice mail management information (journal information) between a voice mail device 6 and a facsimile accumulation switching system 100 is performed through the PBX 1 without using the interface circuits 69 and 101. An interface circuit 20 is provided in the CPU 63 of the voice mail device 6. The interface circuit 20 is connected to the PBX 1 through an interface circuit 1b, and the PBX 1 is connected to the facsimile accumulation switching system 100 through interface circuits 1a and 108 and a line 81. Voice mail management information is sent from the voice mail device 6 to the facsimile accumulation switching system 100 through the interface circuit 20, the interface circuit 1b, the PBX 1, and the interface circuits 1a and 108. Other operations are the same as those of the embodiment of FIG. 9, and explanation thereof is therefore omitted.

Figure 11:
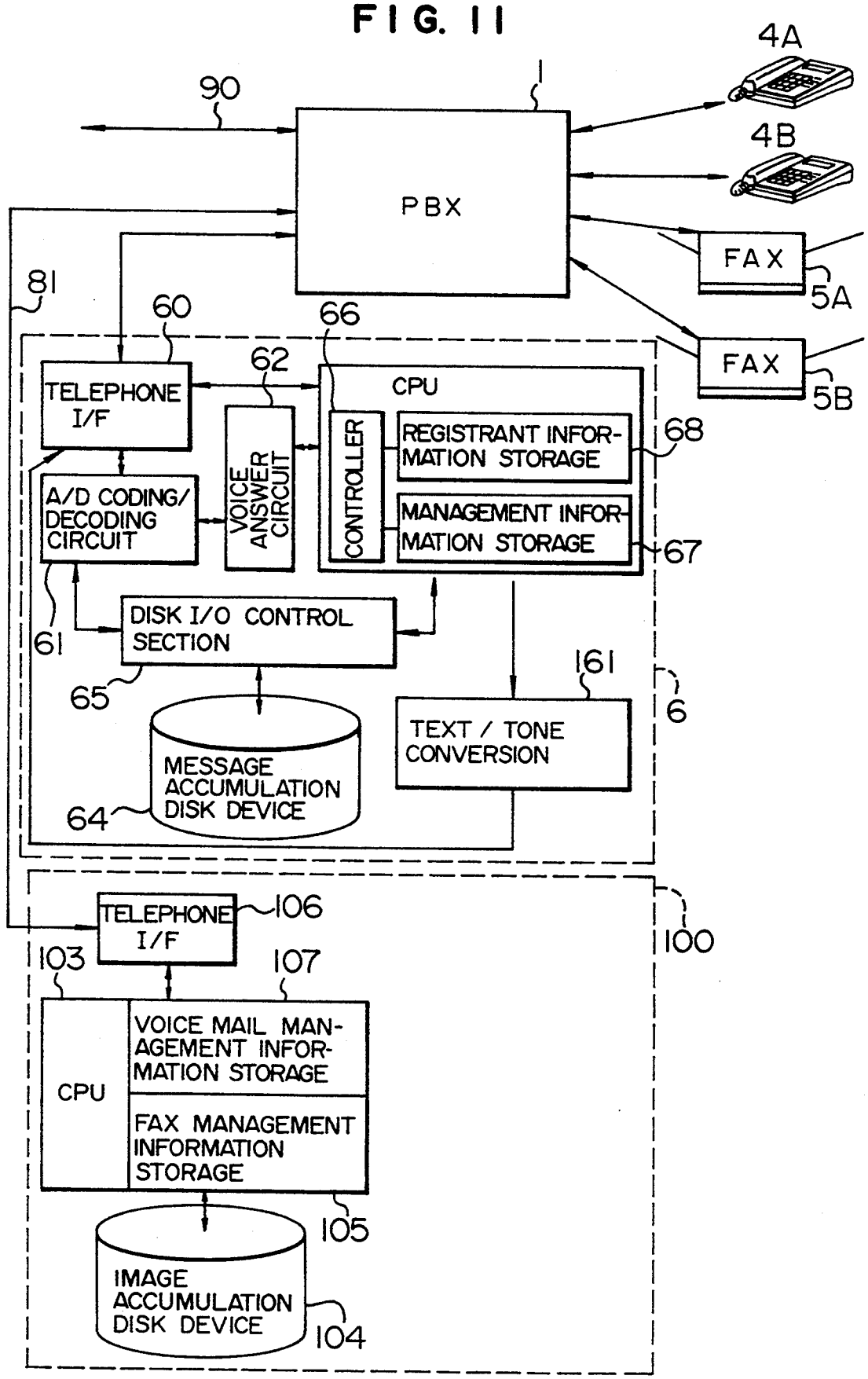

The modification of FIG. 11 is different from the embodiment of FIG. 9 in that the transmission of voice mail management information (journal information) between a voice mail device 6 and a facsimile accumulation switching system 100 is performed, without using the interface circuits 69 and 101, in such a manner that the data are converted into voice information once and then the transmission is performed by using the telephone switching function of the PBX 1. A text/tone conversion circuit 161 is provided in the CPU 63 of the voice mail device 6. The text/tone conversion circuit 161 is connected to the PBX 1 through a telephone interface circuit 60, and the PBX 1 is connected to the facsimile accumulation switching system 100 through a telephone interface circuit 106. Voice mail management information is converted into voice information or a tone signal by the text/tone conversion circuit 161, and the tone signal is transmitted to the PBX 1 through the telephone interface circuit 60. The PBX 1 connects the line to the facsimile accumulation switching system 100 on the basis of a telephone number added to the head portion of the incoming tone signal so that the voice mail management information of the tone signal is set to the facsimile accumulation switching system 100. Since the facsimile accumulation switching system 100 is provided with such a tone/text conversion device as generally provided in a facsimile device, the voice mail management information from the voice mail device 6 is converted into text data by using the tone/text conversion device, and stored into a voice mail management information storage section 107. Other operations are the same as those of FIG. 9, and the explanation thereof is therefore omitted.

The modification of FIG. 12 is different from the embodiment of FIG. 9 in that the transmission of voice mail management information (journal information) between a voice mail device 6 and a facsimile accumulation switching system 100 is performed through a modem 163 and the PBX 1 without using the interface circuits 69 and 101. The modem 163 and a discrimination signal generator section 162 are provided in the CPU 63 of the voice mail device 6. When voice mail management information is to be transmitted from the voice mail device 6 to the facsimile accumulation switching system 100, first, a discrimination signal indicating that the signal to be sent is not a facsimile signal but journal data is generated by the discrimination signal generator section 162, and sent to the PBX 1. The voice mail management information is sent to the PBX 1 through the modem 163. When the line is connected to the facsimile accumulation switching system 100 by the PBX 1, the discrimination signal is detected by a discrimination signal detector section 109 when applied thereto through a telephone interface circuit 106. Upon detection of the discrimination signal, data following the discrimination signal are stored into a voice mail management information storage section 107. Other operations are the same as those of FIG. 9, and the explanation thereof is therefore omitted.

Figure 16:
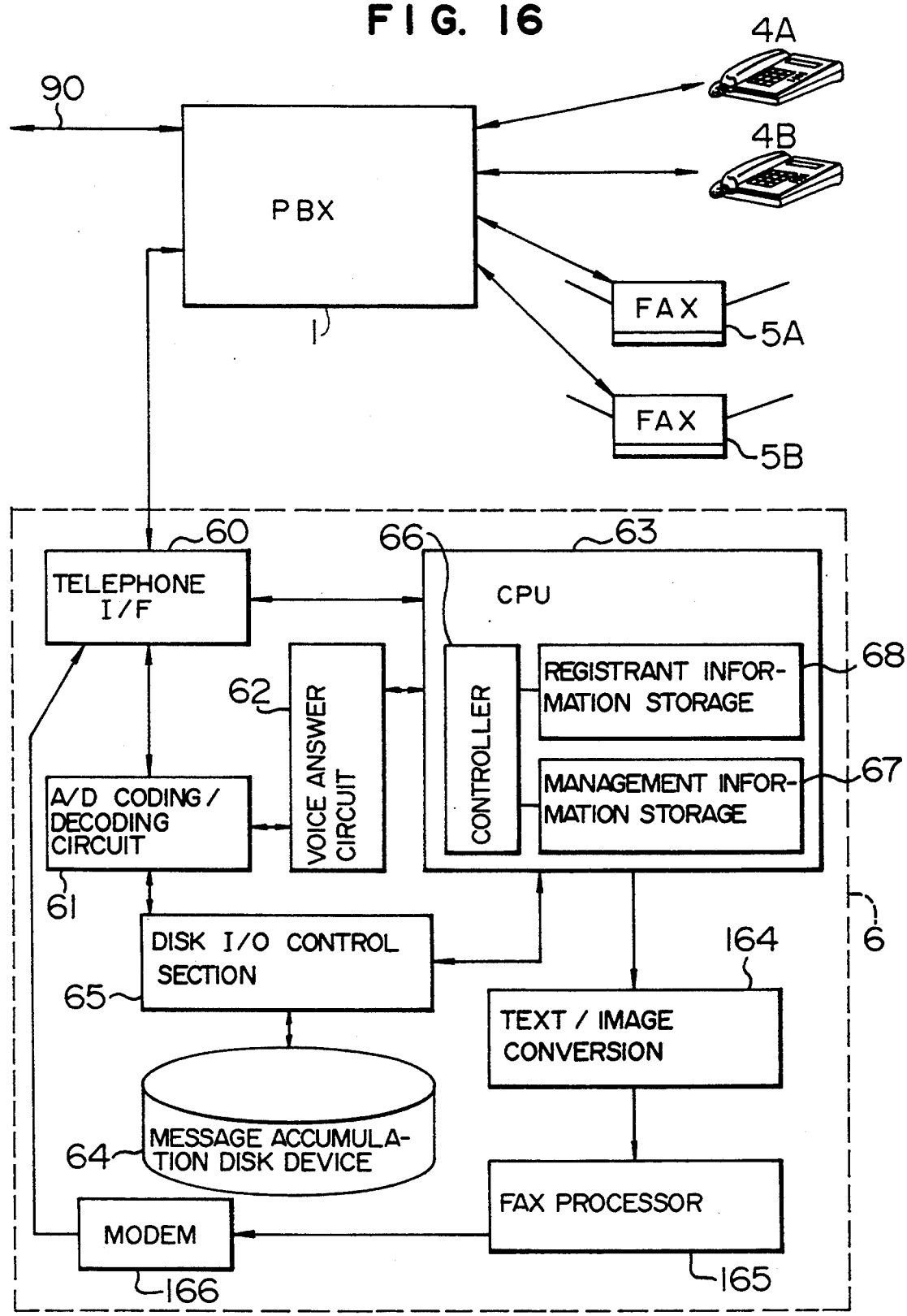
FIGS. 16–18 show respective configurations of the second through fourth embodiments of the voice mail device used in the present invention.

Next, referring to FIG. 16, description will be made of a second embodiment of the voice mail device according to the present invention. In this embodiment, journal information is directly supplied to a facsimile device 5 without using the facsimile accumulation switching system 100. A voice mail device 6 is provided with a text/image conversion device 164, a facsimile processor section 165, and a modem 166 in addition to the configuration of the voice mail device 6 of FIG. 9. Journal information edited by the CPU 63 is converted into image data by the text/image conversion device 164, and sent to the facsimile processor section 165. In the facsimile processor section 165, signal processing is performed in accordance with the facsimile standard so that the image information is sent, through the modem 166, to one of the facsimile devices 5 (5A or 5B), which is selected as an output-side facsimile device of the concerned telephone by referring to a table in which the output-side facsimile device 5 (5A or 5B) is designated for each telephone number, or by an indication from the telephone, or at a polling request from the facsimile device 5 (5A or 5B). In this embodiment, the configuration of the system can be simplified because the facsimile accumulation switching system is not used.

Figure 17:
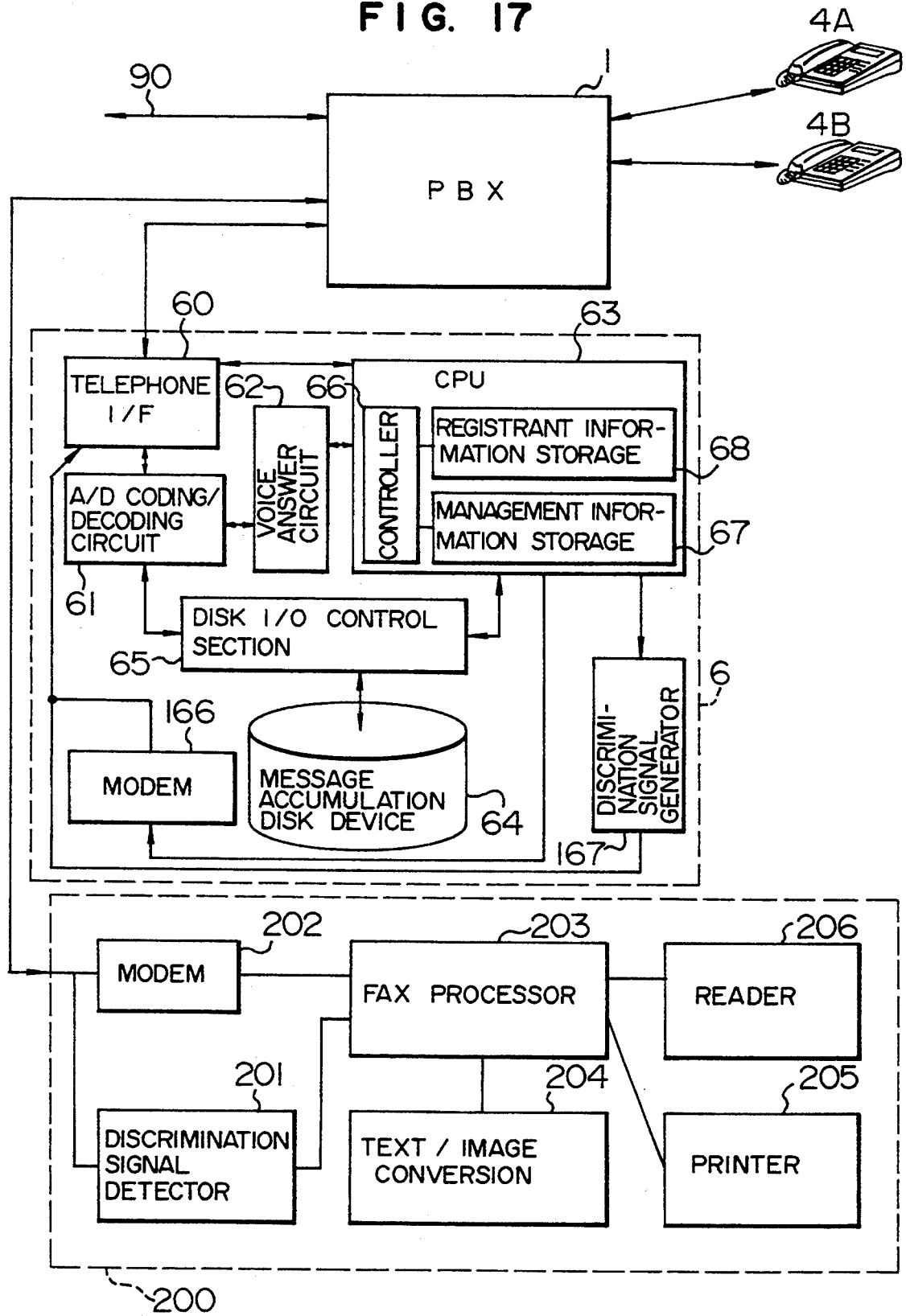

Next, referring to FIG. 17, description will be made of a third embodiment of the voice mail device according to the present invention, in which a text/image conversion device 204 is provided in a facsimile device 200. A voice mail device 6 is provided with a discrimination signal generator section 167 and a modem 166 in addition to the parts provided in the voice mail device 6 of FIG. 9. Data including journal information which is edited in the CPU 63 and a discrimination signal which is generated by the discrimination signal generator section 167 and added to the head of the data are sent to the facsimile device 200 through the modem 169 and the PBX 1. A discrimination signal detector section 201 is provided in the facsimile device 200. When the discrimination signal is contained in the head of the data sent from the voice mail device 6, it is judged that the received signal is a signal of text data, and the discrimination signal is sent to an facsimile processor section 203. The facsimile processor section 203 actuates the text/image conversion section 204 to convert the signal received through a modem 202 into image data, and supplies the image data to a printer 205.

Figure 18:
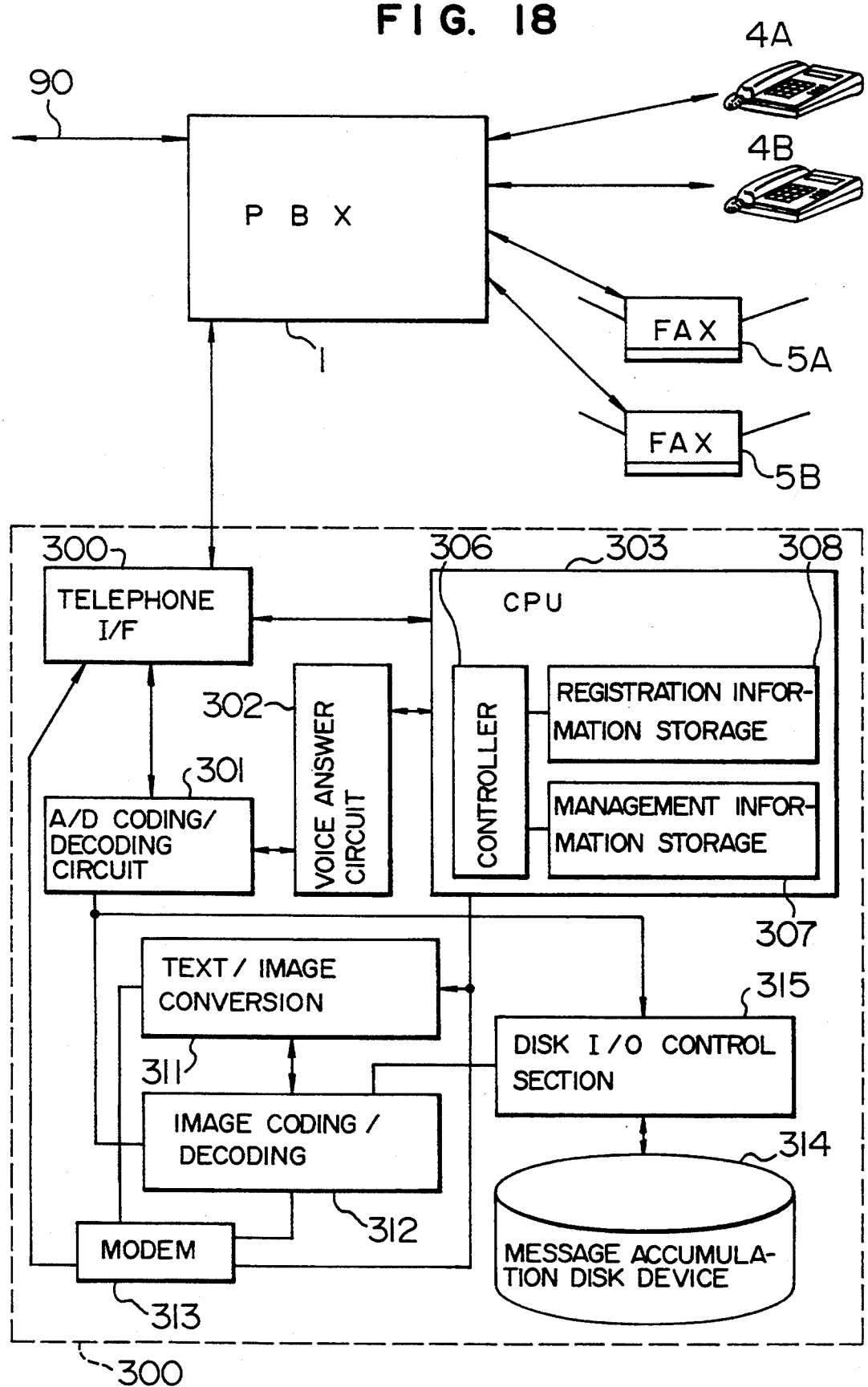

Next, referring to FIG. 18, description will be made of a fourth embodiment of the voice mail device according to the present invention. In this embodiment, used is a multimedia server 300 in which the voice mail device 6 and the facsimile accumulation switching system 100 are combined. Although the multimedia server 300 is almost the same as that disclosed in Japanese Patent Unexamined publication No. JP-A-59-169262, but different in that in this embodiment a table of facsimile numbers of the facsimile devices designated to the respective telephones is provided in a registrant information storage section 308. Therefore, management information (journal information) for voice mail information stored in the multimedia server 300 is converted into image information by a text/image conversion section 311, and transmitted to the designated facsimile device obtained by referring to the table.

As described above, in the first, second, third, and fourth embodiments of the voice mail device according to the present invention, information on need or not of call-back and telephone number of the caller is obtained as management information, and therefore very important voice mail which is really necessary to hear can be easily selected.

Further, if the nearest facsimile device is registered in advance as the output-side facsimile device for the management information for voice mail to a personal telephone in advance, the management information can be taken out through the nearest facsimile device.

We claim:

1. A voice and facsimile mail system comprising:

means for receiving a telephone signal, said telephone signal being either a voice signal or a facsimile signal;

a plurality of telephones;

facsimile mail accumulation and transmission means including a plurality of mail boxes for temporarily storing a facsimile signal in one of the mail boxes and selectively outputting the stored facsimile signal, said mail boxes being allotted to said telephones, respectively;

a telephone number table for storing telephone numbers of the respective telephones and mail box numbers of the mail boxes corresponding to said respective telephones;

judgement means for judging, when the telephone signal is received, whether the received telephone signal is a voice signal or a facsimile signal; and means for transferring said received telephone signal to one of the mail boxes of said facsimile accumulation and transmission means, which is determined by referring to the telephone number table based on a telephone number addressed by the received telephone signal, when it is judged that said received telephone signal is a facsimile signal, and to one of the telephones when it is judged that said received telephone signal is a voice signal.

2. A facsimile mail system comprising:

facsimile mail storage means having a plurality of storage regions designated by mail box numbers corresponding to predetermined telephone numbers for storing facsimile signals;

voice mail means for storing telephone signals;

switching means connected to outside telephone lines and connected through extension telephone lines to said facsimile mail storage means, said voice mail means, a plurality of telephones and at least one facsimile device;

means for judging, when an incoming signal is received by said switching means through one of said outside and extension telephone lines, whether the received incoming signal is a telephone signal or a facsimile signal;

wherein said switching means includes means for transmitting, when it is judged that the received incoming signal is a facsimile signal, the received incoming signal and a telephone number addressed by the received incoming signal to said facsimile mail storage means and, when it is judged that the received incoming signal is a telephone signal, the received incoming signal to one of the telephones addressed by the received incoming signal, and means for switching the received incoming signal to the voice mail means when said one telephone is busy; and said facsimile mail storage means includes means for storing the transmitted facsimile signal in one of the plurality of storage regions designated by one of the mail box numbers corresponding to the telephone number addressed by the received incoming signal.

3. A facsimile mail system according to claim 2, wherein the plurality of storage regions are provided correspondingly to the telephones connected to said switching means and designated by the same telephone numbers as those which designate the corresponding telephones.

4. A facsimile mail system according to claim 2, wherein said telephone and said at least one facsimile device are designated by different telephone numbers, respectively, and whether the received incoming signal is a facsimile signal or a telephone signal is judged based on the telephone number addressed by the received incoming signal.

5. A facsimile mail system according to claim 2, wherein said switching means includes means for transmitting the incoming signal to said voice mail means when the one telephone to which said incoming signal is transmitted is not off-hooked; and said voice mail means comprising:
means for storing management information relating to the incoming signal and including identification information for identifying a transmitter of the incoming signal; and
means for outputting said management information to a selected one of the telephones and the at least one facsimile device.

6. A facsimile mail system according to claim 3, wherein said judging means is provided in each of said plurality of telephones and said switching means includes means for connecting the received telephone signal to one of the telephones specified by the received telephone signal so that whether the received telephone signal is a voice signal or a facsimile signal is judged by the judging means provided to said one telephone.

7. A facsimile mail system according to claim 3, wherein said judging means is provided in said switching means.

8. A facsimile mail system according to claim 3, wherein said judging means is provided in said facsimile mail storage means and said switching means includes means for connecting the received telephone signal to said facsimile mail storage means so that whether the received telephone signal is a voice signal or a facsimile signal is judged by the judging means provided in said facsimile mail storage means.

9. A facsimile mail system according to claim 4, wherein a plurality of facsimile devices are connected to said switching means and the number of said storage regions is larger than the number of said facsimile devices.

10. A facsimile mail system according to claim 4, wherein a plurality of facsimile devices are connected to said switching means and the number of said storage regions is equal to the number of said telephones.

11. A facsimile mail system according to claim 4, wherein a plurality of facsimile devices are connected to said switching means and said storage regions are provided correspondingly to said telephones.

12. A facsimile mail system according to claim 4, further comprising means for informing an owner of one of the telephones designated by the telephone number addressed by the received incoming signal of incoming and accumulation of facsimile mails into the storage region designated by the mail box number corresponding to the telephone number addressed by the received incoming signal through at least one of the telephones, the facsimile device and a pager.

13. A facsimile mail system according to claim 5, wherein said identification information includes information indicating whether the telephone signal has been received through one of the outside telephone lines or one of the extension telephone lines.

14. A facsimile mail system according to claim 5, wherein said identification information includes a telephone number of the transmitter.

15. A facsimile mail system according to claim 5, wherein said management information includes information indicating whether a response to the received telephone signal is required or not.

16. A facsimile mail system according to claim 5, wherein said voice mail means includes an information table for storing second identification information corresponding to said first-mentioned identification information, means for retrieving said second identification information and means for causing said outputting means to output said retrieved second identification information together with said management information to said selected one telephone and the at least one facsimile device.

17. A facsimile mail system according to claim 16, wherein said first identification information includes a telephone number of the transmitter, and said second identification information includes one of names registered correspondingly to extension numbers of the telephones connected to the respective extension telephone lines.

18. A facsimile mail system according to claim 16, wherein the telephones connected to said switching means are allotted to predetermined sections, respectively, and said first identification information includes a telephone number of the transmitter of the received telephone signal, and said second identification information includes a name of one of the sections to which the received telephone signal is connected.

19. A telephone device to be connected to a switching system having a transfer function, said telephone device comprising:
a telephone number storage means for storing a telephone number of a predetermined different telephone to which a telephone signal addressed to said telephone device is to be transferred;
judging means for judging whether a received telephone signal is a voice signal or a facsimile signal;
means for transmitting to said switching system a transfer request together with the telephone number of the different telephone, when it is judged that said received telephone signal is a facsimile signal, to request said switching system to transfer the received facsimile signal to said different telephone.

20. A voice mail system comprising:
facsimile means;
a voice mail device;
switching means connected to said facsimile means and said voice mail device for receiving a telephone signal transmitted from outside and connecting the received telephone signal to said voice mail device together with management information relating to the received telephone signal and including identification information identifying a transmitter that has transmitted the received telephone signal;

converting means for converting the management information into image data adapted to be displayed on the facsimile means; and transmitting means responsive to an output request externally applied thereto for causing said switching means to transmit the management information to said converting means so that said management information is converted into said image data and transmit said image data to said facsimile means.

21. A voice mail system according to claim 20, wherein said voice mail device includes a plurality of mail boxes, said facsimile means includes a plurality of facsimile devices respectively allotted to said mail boxes, said management information provided to said voice mail device being stored in one of said mail boxes specified by the received telephone signal and said image data being transmitted to one of the facsimile devices allotted to said one mail box at a predetermined timing.

22. A voice mail system according to claim 20, wherein said output request is applied from said facsimile means to said transmitting means.

23. A voice mail system according to claim 20, further comprising a plurality of telephones connected to said switching means and wherein said facsimile means includes a plurality of facsimile devices, said output request being applied from one of said telephones to said transmitting means, and said image data being transmitted to one of said facsimile devices designated by said output request.

24. A voice mail system according to claim 20, wherein said facsimile means includes a plurality of facsimile devices, said voice mail device includes a plurality of mail boxes respectively allotted to said facsimile devices, said telephone signal provided to said voice mail device being stored in one of said voice mail box designated by said telephone signal, and said image data being transmitted to one of said facsimile devices allotted to said one mail box.

25. A facsimile mail system comprising:

switching means connected to a telephone, facsimile means, a voice mail information memory and voice mail means for receiving a telephone signal transmitted from outside, connecting said received telephone signal to said telephone and operating, when said telephone is not off-hooked, to connect said telephone signal to said voice mail means and store management information relating to said received telephone signal into said voice mail information memory;

converting means for converting said management information into image data; and outputting means responsive to an output request externally applied thereto for causing said switching means to transmit said management information to said converting means so that said management information is converted into the image data and to output said image data to said facsimile means.

26. A facsimile mail system according to claim 25, wherein said voice mail device includes a plurality of mail boxes, said facsimile means includes a plurality of facsimile devices respectively allotted to said mail boxes, said telephone signal provided to said voice mail means being stored in one of the mail boxes specified by the received telephone signal and said image data being transmitted to one of the facsimile devices corresponding to said one mail box at a predetermined timing.

27. A voice mail system according to claim 25, wherein said output request is applied from said facsimile means to said transmitting means.

28. A voice mail system according to claim 25, further comprising a plurality of telephones connected to said switching means and wherein said facsimile means includes a plurality of facsimile devices, said output request being applied from one of said telephones to said transmitting means, and said image data being transmitted to one of said facsimile devices designated by said output request.

29. A voice mail system according to claim 25, wherein said facsimile means includes a plurality of facsimile devices, said voice mail device including a plurality of mail boxes respectively allotted to said facsimile devices, said telephone signal connected to said voice mail device being stored in one of said voice mail boxes designated by said telephone signal, and said image data being transmitted to one of said facsimile devices allotted to said one mail box.

30. A voice mail system comprising:

a plurality of telephones;

a plurality of facsimile devices corresponding to said plurality of telephones, respectively;

switching means connected to said plurality of telephones, said plurality of facsimile devices and voice mail means for receiving a telephone signal addressed to one of said telephones and connecting said received telephone signal to said voice mail means;

first memory means provided to said voice mail means for storing a table showing correspondence between said plurality of telephones and said plurality of facsimile devices;

second memory means connected to said voice mail means for storing management information relating to said telephone signal connected to said voice mail means;

converting means for converting said management information into a facsimile signal adapted to be reproduced by any one of said facsimile devices;

means responsive to an output request externally applied thereto for causing said switching means to transmit said management information stored in said second memory means to said converting means so that said management information is converted to said facsimile signal, to select one of said facsimile devices corresponding to a telephone addressed by said received telephone signal based on said table and to transmit said facsimile signal to said selected one facsimile device.

* * * * *